United States Patent
Kojima et al.

(10) Patent No.: US 6,262,554 B1
(45) Date of Patent: Jul. 17, 2001

(54) ELECTRONIC DEVICE AND METHOD OF CONTROLLING THE SAME

(75) Inventors: Hiroyuki Kojima, Shiojiri; Makoto Okeya, Shimosuwa-machi; Hiroshi Yabe, Shiojiri; Noriaki Shimura, Shiojiri; Joji Kitahara, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/404,054

(22) Filed: Sep. 22, 1999

(30) Foreign Application Priority Data

Sep. 22, 1998 (JP) .................................................. 10-268532
Oct. 5, 1998 (JP) .................................................. 10-283013

(51) Int. Cl.$^7$ .................................................. G05B 19/40
(52) U.S. Cl. ..................... 318/685; 318/696; 318/138; 318/254; 318/439; 318/445; 318/446
(58) Field of Search ..................... 318/685, 696, 318/138, 254, 439, 445, 446

(56) References Cited

U.S. PATENT DOCUMENTS

| | | | | |
|---|---|---|---|---|
| 3,579,277 | * | 5/1971 | Imahashi | 310/156 |
| 3,855,781 | * | 12/1974 | Chihara et al. | 318/138 |
| 4,109,170 | * | 8/1978 | Fujita et al. | 318/254 |
| 4,347,536 | * | 8/1982 | Miyashita et al. | 318/138 |

FOREIGN PATENT DOCUMENTS

| | | |
|---|---|---|
| 61-47390 | 8/1977 | (JP) . |
| 2-22349 | 4/1983 | (JP) . |
| 58-68683 | 4/1983 | (JP) . |
| 60-56080 | 7/1983 | (JP) . |
| 59-40186 | 3/1984 | (JP) . |
| 63-34435 | 6/1986 | (JP) . |
| 1-244389 | 9/1989 | (JP) . |
| 6-235777 | 8/1994 | (JP) . |

* cited by examiner

Primary Examiner—Karen Masih
(74) Attorney, Agent, or Firm—Stroock & Stroock & Lavan LLP

(57) ABSTRACT

In an electronic device having a stepping motor which can be driven more quickly than in a normal driving operation without causing a significant increase in power consumption, a detecting coil control circuit is provided which controls a connection circuit serving to open and close a detecting coil that is wound coaxially with a driving coil, in such a manner that the detecting coil is opened during the period in which a quick driving pulse is supplied to the driving coil. After supplying the quick driving pulse, a driving controller controls a driving circuit so as to open the driving coil, while the driving controller closes the detecting coil so that a voltage induced in the detecting coil by an electromotive force is detected by a position detecting circuit thereby determining the position of a rotor. The chance that the driving coil and the detecting coil act as electromagnetic brakes is minimized thereby ensuring that the quick driving operation is performed with low power consumption. During the quick driving operation in which the rotor rotates at a high speed, the position of the rotor is monitored thereby ensuring that the quick driving operation is performed in a stable fashion. Additionally, the timing of the delivery of the driving pulses may be varied in response to a measured voltage.

36 Claims, 12 Drawing Sheets

ELECTRONIC DEVICE AND METHOD OF CONTROLLING THE SAME

BACKGROUND OF THE INVENTION

1. Field of the Invention

The present invention relates to an electronic device such as a timepiece device including a stepping motor and to a method of controlling such an electronic device. More particularly, the present invention relates to an electronic device capable of driving a stepping motor at a higher rate than in a normal mode and to a method of controlling such an electronic device.

2. Description of the Related Art

A stepping motor, also called a pulse motor, a stepper motor, or a digital motor, is widely used as an actuator in a digital controlling apparatus wherein the stepping motor is driven by a pulse signal. In recent years, various electronic devices have been developed which are small in size, suitable for a user to carry. In such electronic devices, a small-sized light-weight stepping motor is widely used as an actuator. A representative example of such an electronic device is a timepiece device such as an electronic clock, a timer switch, chronograph, etc.

FIG. 13 illustrates a typical structure of a stepping motor 10 used in a timepiece device. As shown in FIG. 13, the stepping motor 10 includes a disk-shaped rotor 13 magnetized in a two-pole form. The rotor 13 is adapted to rotate in a stator 12 including parts combined together into the form of a single piece with a magnetic saturating part 17 having a notch formed on the outer end face. As the rotor 13 rotates in response to driving pulses supplied at a proper frequency such as 1 Hz, hands of the timepiece device, which are geared to the rotor 13, are driven by a driving force of the rotor 13. To correctly drive the hands without producing an error, it is important to monitor whether the rotor 13 is successfully and properly driven to rotate. To this end, a current or voltage is detected that is induced in the driving coil by a back electromotive force created by the rotation of the rotor 13.

In the current induced by the back electromotive force generated by the rotation of the rotor 13, as shown in FIG. 14, a first peak PM1, with a polarity opposite to that of the driving pulse DP, appears when the rotor 13 passes through the position different in angle by approximately 90° from the stable position. As the rotor 13 further rotates, the current induced by the electromotive force becomes zero at the position A. After that, a first large peak PP1, with the same polarity as the driving pulse DP, appears in the induced current when the rotor 13 passes through the stable position B, which is the destination (in the opposite pole) and which is different in angle by 180° from the starting position. After that, second peaks PM2 and PP2 appear in response to a vibration around the stable position B until the rotor 13 finally comes to rest at the position B.

Although the first peaks PM1 and PP1 have large values, a transient current TW, due to the driving pulse DP, makes it difficult to distinguish in time the driving pulse DP from the first peak PM1 or PP1. For this reason, in the conventional technique, the second peak PM2 or PP2, which can be easily distinguished from the driving pulse DP, is employed to detect the rotation in the normal hand driving mode. To amplify the peak level, a chopper-assisted amplification technique is used.

In recent years, timepiece devices, such as wristwatches, have been formed with various capabilities. An example is the ability to drive the stepping motor more quickly than in the normal hand driving mode so as to automatically or manually adjust the time. To drive the stepping motor in the quick driving mode, it is required to supply quick driving pulses at intervals shorter than in the normal driving mode. Furthermore, during the quick driving operation for time adjustment, it is required to correctly drive the hands, that is, it is required to drive the rotor with no error. To meet the above requirements, it is required to determine, as early as possible after delivery of the driving pulse DP, whether the rotor 13 has been successfully driven. From this point of view, it is desirable to detect a first peak PM1 or PP1, or a phenomenon associated with the first peak PM1 or PP1 such as a transition of polarity of the current induced by the back electromotive force. To this end, it has been proposed to provide a detecting coil wound around a stator 12 separately from the driving coil so that the current induced by the back electromagnetic force is detected by the detecting coil. If the detecting coil is electrically isolated from the driving coil, the influence of the transient current caused by the driving pulse is suppressed, and thus it becomes easier to detect the first peak PM1 or PP1 or a phenomenon associated with the first peak PM1 or PP1.

However, the current induced by the back electromotive force flowing, as shown in FIG. 14, through the detecting coil creates a magnetic force in a direction against the rotation of the rotor 13. That is, the detecting coil acts as an electromagnetic brake against the motion of the rotor 13. Therefore, it is required to increase the effective power of the driving pulse so as to create a large enough driving force taking the braking force into account. This results in an increase in electric power consumed to drive the stepping motor. In particular, in the quick driving mode, a greater backward current is induced in the detecting coil because of higher-speed rotation of the rotor 13, and thus the detecting coil creates an even greater braking force. To drive the rotor at a required high speed against the large braking force, it is needed to supply driving pulses with a greater effective power. As a result, the power consumption further increases. Furthermore, the fact that the braking force increases with the speed of rotation makes it difficult to drive the rotor at a high speed.

Also, in the operation of detecting the rotation of the rotor 13 at an early juncture, where there is a transient current or where there is a timing error, there is a possibility that the rotation of the rotor 13 cannot be detected and thus the detection timing is not obtained. In this case, to continue the quick driving operation, it is required to supply a quick driving pulse with an opposite polarity with proper timing. However, unlike the normal hand driving operation in which driving pulses are supplied with fixed timing, for example at 1 Hz, it is impossible to correctly determine the timing corresponding to the rotation of the rotor 13 being quickly driven. Therefore, if the position of the rotor 13 fails to be detected, it becomes impossible to supply a quick driving pulse with proper timing. Thus, the driving pulse supplied with wrong timing can cause a braking force against the rotation of the rotor 13. Furthermore, a first timing error in supplying a quick driving pulse can cause timing errors one after another in the following operation. Thus, once a timing error in supplying a driving pulse occurs, the following timing tends to become incorrect, and thus it becomes difficult to continue the quick driving operation in a stable fashion.

In view of the above, it is an object of the present invention to provide an electronic device that includes a stepping motor, and a method of controlling such an electronic device, which uses a detecting coil and is capable of determining whether or not the rotor of the stepping motor has been successfully driven without creating a significant braking force due to a current induced in the detecting coil.

It is another object of the present invention to provide an electronic device capable of quickly driving the stepping motor in a stable fashion with less power consumption than devices found in the prior art.

It is yet another object of the present invention to provide an electronic device and a method of controlling an electronic device, in which, when the position of the rotor is not successfully detected during the operation of driving the rotor by outputting driving pulses in accordance with the angular position of the rotor, a quick driving pulse is supplied with timing corresponding to the rotation of the rotor thereby ensuring that the stepping motor can be quickly driven in a highly reliable fashion.

SUMMARY OF THE INVENTION

To achieve the above objects, the present invention provides an electronic device that includes a stepping motor. In one embodiment, the stepping motor has a detecting coil which is opened when a driving pulse is supplied to a driving coil of the stepping motor, whereas the detecting coil is closed when the position of the rotor of the stepping motor is detected, thereby minimizing the braking force generated by current induced in the detecting coil by a back electromotive force. More specifically, according to an aspect of the present invention, there is provided an electronic device comprising: a stepping motor including a rotor magnetized in the form of a magnetic multipole, and, a stator including a driving coil and a detecting coil, the rotor being driven to rotate in the stator; driving controller means for supplying a driving pulse to the driving coil to drive the rotor; position detecting means for detecting a current induced in the detecting coil by a back electromotive force created by rotation of the rotor; and detecting coil controlling means for controlling the detecting coil such that the detecting coil is maintained in an open state when the driving pulse is being supplied to the driving coil, and, in a closed state, when the driving pulse is turned off.

According to another aspect of the present invention, there is provided a method of controlling an electronic device that includes a stepping motor having a rotor magnetized in the form of a magnetic multipole and a stator including a driving coil and a detecting coil, the rotor being driven to rotate in the stator, wherein the method comprises the steps of: a driving step for opening the detecting coil and supplying a driving pulse to the driving coil to drive the rotor; and a position detecting step for closing the detecting coil and detecting a back electromotive force which is induced in the detecting coil by rotation of the rotor.

If the detecting coil is maintained in an open state during the period in which a driving pulse is supplied to the driving coil, no current induced by the back electromotive force flows through the detecting coil. Therefore, the detecting coil does not create an electromagnetic braking force during the period in which the driving pulse is supplied to the driving coil.

The detecting coil is closed at the expiration of the period during which the driving pulse is supplied, so that the rotation of the rotor is detected by detecting a back electromotive force generated in the detecting coil by the rotation of the rotor. Because the detecting coil is electrically isolated from the driving coil, the influence of a transient current caused by the driving pulse is minimized. This makes it possible to easily detect the peak of the back electromotive force generated in the detecting coil or an associated phenomenon such as a zero-crossing point. That is, it becomes possible to determine, relatively quickly after the delivery of the driving pulse, whether or not the rotor has been rotated by detecting a first peak or an associated phenomenon. In the electronic device, and the method of controlling the electronic device, according to the present invention, as described above, the braking force produced by the detecting coil is minimized and thus the stepping motor can be driven by the driving pulse with relatively small effective electric power.

In a quick driving operation, the rotation of the rotor can be determined relatively quickly after the delivery of the driving pulse. Therefore, it becomes possible to drive the rotor at a high speed with low electric power. Furthermore, it also becomes possible to perform the quick driving operation in a stable fashion.

In the electronic device and the method of driving the electronic device according to the present invention, the driving step is preferably capable of supplying a quick driving pulse at intervals shorter than intervals at which a normal driving pulse is supplied. In this case, the rotor is driven by a driving pulse with low effective electric power in the normal driving mode, and the rotor is preferably brought to rest after it has rotated a predetermined angle, preferably 180° in the case of a timepiece device. On the other hand, in the quick driving mode, the rotor is preferably rotated continuously without being brought to rest at a particular position. To this end, the electronic device preferably includes driving controller means capable of supplying both normal driving pulses and quick driving pulses at intervals shorter than in the normal driving mode, wherein the driving controller means opens the driving coil after supplying a quick driving pulse, whereas, the driving controller means closes the driving coil after supplying a normal driving pulse. Furthermore, in the method of controlling an electronic device according to the invention, the driving step is preferably capable of supplying both normal driving pulses and quick driving pulses at intervals shorter than intervals at which normal driving pulses are supplied, wherein the driving step further comprises the steps of: opening the driving coil after supplying a quick driving pulse; and closing the driving coil after supplying a normal driving pulse.

Where the driving coil is closed after supplying a normal driving pulse, a current is induced in the driving coil by a back electromotive force and thus the driving coil acts as an electromagnetic brake. In this case, the current induced by the electromotive force in the driving coil is used to detect the rotation of the rotor because the normal driving pulses are supplied at large intervals which allow the second peak of the induced current to be discriminated from the corresponding driving pulse. Of course, the detecting coil may be closed to determine whether or not the rotor has been rotated on the basis of a current induced in the detecting coil by the back electromotive force. In this case, the braking force is increased by the current flowing through the detecting coil.

While the driving coil is opened after supplying a quick driving pulse, no current due to the back electromotive force flows through the driving coil, and thus no electromagnetic braking force is created by the driving coil. This results in a reduction in the overall braking force against the motion of the rotor, and thus it becomes possible to drive the rotor to rotate at a high speed by driving pulses with low effective power. Although the driving coil is opened, it is possible to determine whether or not the rotor is rotated on the basis of a current induced in the closed detecting coil by the back electromotive force.

In the electronic device and the method of driving the electronic device according to the present invention, as described above, the driving coil and the detecting coil are formed separately from each other, and, in the quick driving mode in which the rotor is driven at a high speed, the driving coil is connected only when driving pulses are supplied, whereas, the detecting coil is closed only when it is required to detect the current induced in the detecting coil by the back electromotive force. In this case, the driving coil and the detecting coil may be optimized in terms of the number of turns or other conditions independently of each other. Furthermore, the above-described technique according to the invention ensures that when one of the coils is not used, no electromagnetic braking force is generated by the unused coil. On the other hand, in the normal driving mode in which the rotor is driven by normal driving pulses, the driving coil may be closed so that the driving coil acts as an electromagnetic brake.

At high-to-low transitions of the driving pulses, high frequency noise in the form of spikes is induced in the detecting coil. To avoid the problems associated with such noise, it is desirable to provide a masking period during which both the driving coil and the detecting coil are opened.

In a further embodiment, the invention provides an electronic device in which the voltage of a power supply of a driving pulse in a stepping motor is employed as one of the factors according to which the operation of the stepping motor is controlled. This is based on the fact that the speed and acceleration of rotation of the rotor depend on the power supply voltage of the driving pulse. More specifically, according to a further aspect of the present invention, there is provided an electronic device comprising: a stepping motor including a rotor magnetized in the form of a magnetic multipole and a stator including a driving coil, with the rotor being adapted to rotate in the stator; driving controller means for supplying a driving pulse to the driving coil to drive the rotor; and electric power supplying means serving as a power supply of the driving pulse, wherein the driving controller means is capable of changing the timing of supplying the driving pulse in accordance with the power supply voltage of the driving pulse. According to another aspect of the present invention, there is provided a method of controlling an electronic device that includes a stepping motor having a rotor magnetized in the form of a magnetic multipole and a stator including a driving coil, the rotor being adapted to rotate in the stator, the method comprising a driving step for supplying a driving pulse to the driving coil to drive the rotor wherein the timing of supplying the driving pulse is varied depending on the power supply voltage of the driving pulse.

When the power supply voltage of the driving pulse is high, the driving pulse has a large effective power even if its pulse width is small, as is the case with a quick driving pulse. As a result, the high power supply voltage causes the rotor to rotate at a high speed, and the speed of the rotor tends to increase. On the other hand, when the power supply voltage is low, the effective power of the driving pulse becomes low. As a result, the rotor rotates at a low speed, and the speed of the rotor tends to decrease. Therefore, it is possible to output a driving pulse with correct timing corresponding to the rotation of the rotor, by controlling the timing of the output of the driving pulses depending on the power supply voltage.

In the case where the rotor is driven at a fixed frequency, it is not required to adjust the timing of the output of the driving pulse. Therefore, even if a reduction in the power supply voltage occurs, or if the power supply voltage is varied to control the effective power, the timing of the supply of the driving pulses is not adjusted depending on the power supply voltage. However, the process of varying the timing of supplying the driving pulses depending on the power supply voltage is very useful in an electronic device that includes a driving controller means having a quick driving controller for supplying quick driving pulses at intervals shorter than the intervals at which normal driving pulses are supplied, and also very useful in a method that includes a driving step having a quick driving step in which quick driving pulses are supplied. That is, when the rotor is driven in a self-excited fashion in which driving pulses are supplied with timing determined by the angular position of the rotor, the intervals of the quick driving pulses are decreased where the power supply voltage is high; whereas the intervals of the quick driving pulses are increased where the power supply voltage is low so that the quick driving pulses are supplied with correct timing corresponding to the motion of the rotor rotated at a proper speed thereby ensuring that the quick driving operation is performed in a stable fashion.

Thus, in an electronic device, or in a method of controlling an electronic device, in which an electromotive force, excited by rotation of the rotor, is detected by position detecting means, or in a position detecting step, and the timing of supplying driving pulses in the quick driving operation is determined on the basis of the detection timing associated with the position of the rotor, where the detection timing fails to be detected, the next quick driving pulse is outputted with quick timing if the power supply voltage is high, whereas, the next quick driving pulse is outputted with slow timing if the power supply voltage is low, thereby ensuring that the driving pulse is supplied with correct timing corresponding to the rotation of the rotor even when the detection timing is not obtained.

In the electronic device, or in the method of controlling the electronic device, in which the pulse width of quick driving pulses is determined on the basis of the detection timing associated with the position of the rotor, where the detection timing is not obtained, a quick driving pulse with a small pulse width is supplied next if the power supply voltage is high, whereas, a quick driving pulse with a large pulse width is supplied if the power supply voltage is low, so that the rotor is driven in the quick driving mode even if the detection timing is not obtained.

The techniques disclosed above may also be applied to portable type electronic devices which use batteries as a power supply that tend to change in voltage; and, also to an electronic device which includes electric power supplying means having voltage control means capable of increasing or decreasing the power supply voltage to control the electric power of the driving pulses, thereby performing a quick driving operation in a stable fashion.

DESCRIPTION OF THE PREFERRED EMBODIMENTS

Figure 1:
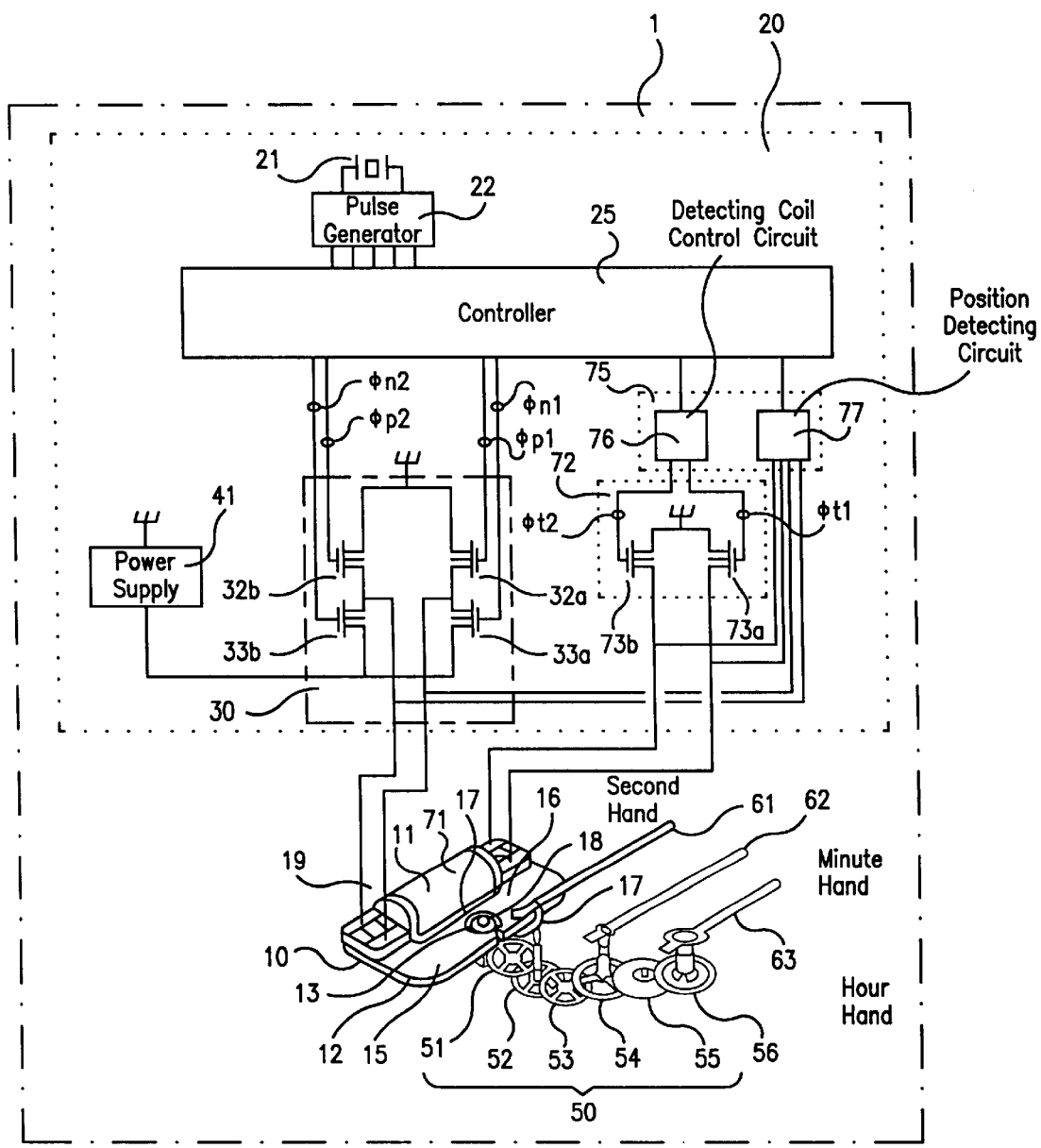
FIG. 1 is a schematic diagram illustrating an embodiment of a timepiece device including a stepping motor, according to the present invention.

The present invention is described in further detail below with reference to the accompanying drawings. FIG. 1 illustrates an example of a timepiece device which uses a stepping motor, such as a wristwatch. The timepiece device 1 includes a stepping motor 10, a controller 20 for driving the stepping motor 10, a wheel train 50 for transmitting the motion of the stepping motor 10, and a second hand 61, a minute hand 62, and an hour hand 63 which are driven by the wheel train 50. The stepping motor 10 includes: a driving coil 11 which generates a magnetic force when a driving pulse is supplied from the controller 20 to the driving coil 11; a stator 12 excited by the driving coil 11; and a rotor 13 which is located in a space surrounded by the stator 12 and which is rotated by a magnetic field generated by the stator 12, wherein the rotor 13 is formed of a disk-shaped two-pole permanent magnet. In the stator 12, a magnetic saturation part 17 is formed such that a magnetic force generated by the driving coil 11 creates opposite magnetic poles at proper locations 15 and 16 on the perimeter around the rotor 13. Furthermore, the stator 12 also includes an inner notch 18 formed at a proper location on the inner wall of the stator 12 such that a cogging torque produced by the presence of the inner notch 18 causes the rotor 13 to come to rest in a proper position which determines the direction of rotation of the rotor 13.

The rotation of the rotor 13 of the stepping motor 10 is transmitted to the respective hands via the wheel train 50 consisting of a fifth wheel 51, a fourth wheel 52, a third wheel 53, a second wheel 54, a minute wheel 55, and hour wheel 56. A second hand 61 is connected to the fourth wheel 52, and a minute hand 62 is connected to the second wheel 54. A hour hand 63 is connected to the hour wheel 56. The time is represented by these hands in response to the rotation of the rotor 13. The wheel train 50 may also be connected to a transmission system (not shown) for indicating the year, month, and day.

In this timepiece device 1, driving pulses are periodically generated by dividing a signal at a reference frequency and supplied to the stepping motor 10 thereby driving the hands such that the current time is indicated by the hands 61–63. The controller 20 employed in the present embodiment to control the stepping motor 10 includes a pulse generator 22 for generating pulses at the reference frequency using a reference oscillator 21, such as a quartz oscillator, and also various pulses different in pulse width or timing. The controller 20 also includes a driving controller 25 for controlling the stepping motor 10 in accordance with various pulse signals supplied from the pulse generator 22, and a detecting circuit 75 for detecting the rotation of the rotor 13.

The driving controller 25 has the capability of supplying 1 Hz driving pulses DP to the driving coil 11 via a driving circuit so as to drive the driving rotor 13 of the stepping motor 10 thereby driving the hands 61–63 in a normal driving mode. The driving controller 25 also has the capability of supplying quick driving pulses JP for driving the rotor 13 in a forward or reverse direction at a rate higher than in the normal driving mode. Furthermore, the driving controller 25 also has the capability of outputting an auxiliary pulse with effective power greater than that of the driving pulse when the driving rotor 13 is not properly driven to rotate and then outputting, following the auxiliary pulse, a recovery pulse to recover the energy of the rotor.

The normal driving pulses DP and the quick driving pulses JP are supplied to the stepping motor 10 via a driving circuit 30 which operates in response to control signals supplied from the driving controller 25. The driving circuit 30 includes a bridge circuit consisting of an n-channel MOSFET 33a, a p-channel MOSFET 32a, an n-channel NOSFET 33b, and a p-channel MOSFET 32b wherein the n-channel MOSFET 33a and the p-channel MOSFET 32a are connected in series and the n-channel MOSFET 33b and the p-channel MOSFET 32b are connected in series. Electric power supplied from a power supply 41 to the driving coil 11 of the stepping motor 10 is controlled by the MOSFETs 32a, 33a, 32b and 33b. MOSFET is an acronym for metal-oxide semiconductor field-effect transistor.

In the present embodiment, the stepping motor 10 includes a coil part 19 around which a detecting coil 71 as well the driving coil 11 is wound. Two ends of the detecting coil 71 are connected to a connection circuit 72 consisting of p-channel MOSFETs 73a and 73b connected in parallel. The MOSFETs 73a and 73b of the connection circuit 72 are controlled by control signals φt1 and φt2, respectively, supplied from a detecting coil control circuit 76 of the detecting circuit 75. As will be described in detail later, when in the quick driving mode, the detecting coil 71 is closed via the connection circuit 72, after quick driving pulses JP have been supplied, thereby allowing a back electromotive force to be generated in the detecting coil 71. The voltage induced in the detecting coil 71 by the back electromotive force is chopped by the connection circuit 72 and amplified. The resultant chopped and amplified voltage is supplied to a position detecting circuit 77 of the detecting circuit 75. The position detecting circuit 77 detects the position of the rotor 13 by detecting a peak level or a zero-crossing point of the received voltage.

The position detecting circuit 77 is also connected to the driving coil 11 so that the position of the rotor 13 may be detected on the basis of the voltage induced by the back electromotive force in the driving coil 11.

Figure 2:
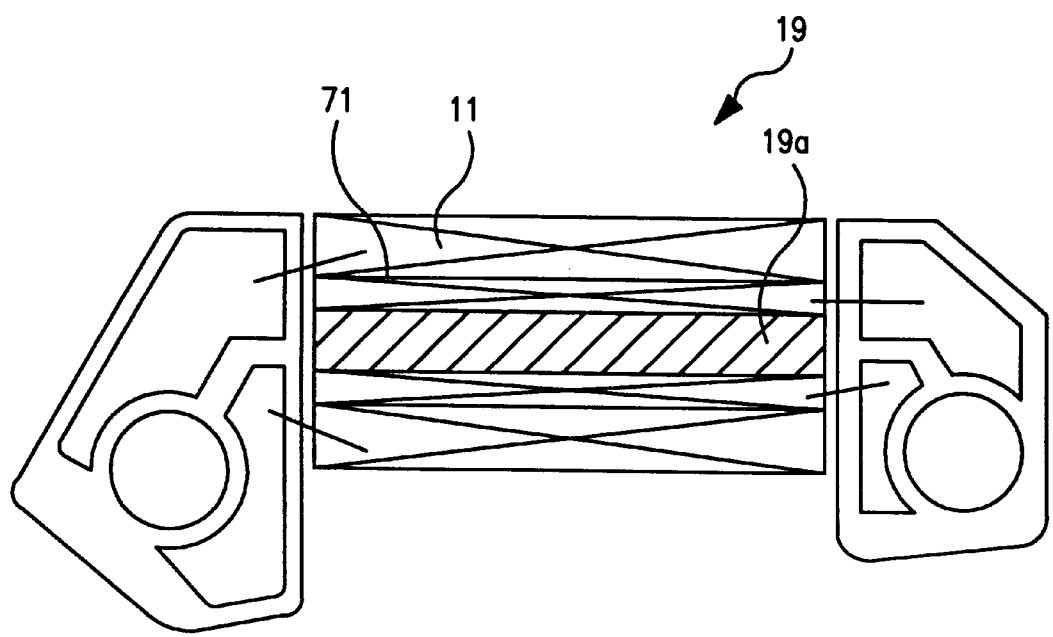
FIG. 2 is a cross-sectional view illustrating the coil part of the stepping motor shown in FIG. 1.

FIG. 2 is a cross-sectional view, taken along a longitudinal direction, of the coil part 19 employed in the stepping motor 10 according to the present embodiment. In the coil part 19 of the present embodiment, the detecting coil 71 is wound around a core 19a and the driving coil 11 is wound around the outside of the detecting coil 71. The detecting coil 71 disposed in the inner layer is wound in a regular fashion such that the envelope of the resultant winding becomes substantially flat thereby ensuring that no degradation in performance occurs in the driving coil 11 located in the outer layer of the two coaxially wound coils 71 and 11. Of course, the driving coil 11 may be disposed in the inner layer. In this case, it is desirable that the inner-side driving coil 11 be wound in a regular fashion so that the outer-side detecting coil 71 encounters no degradation in characteristics such as resistance thereby ensuring that the back electromotive force can be detected in a reliable fashion. Although the driving coil 11 and the detecting coil 71 may be wound at locations spaced away from each other, it is desirable to wind the driving coil 11 and the detecting coil 71 in a coaxial fashion thereby allowing the coils to be installed in a small space and thus allowing the stepping motor 10 to be formed in a small size.

Figure 3:
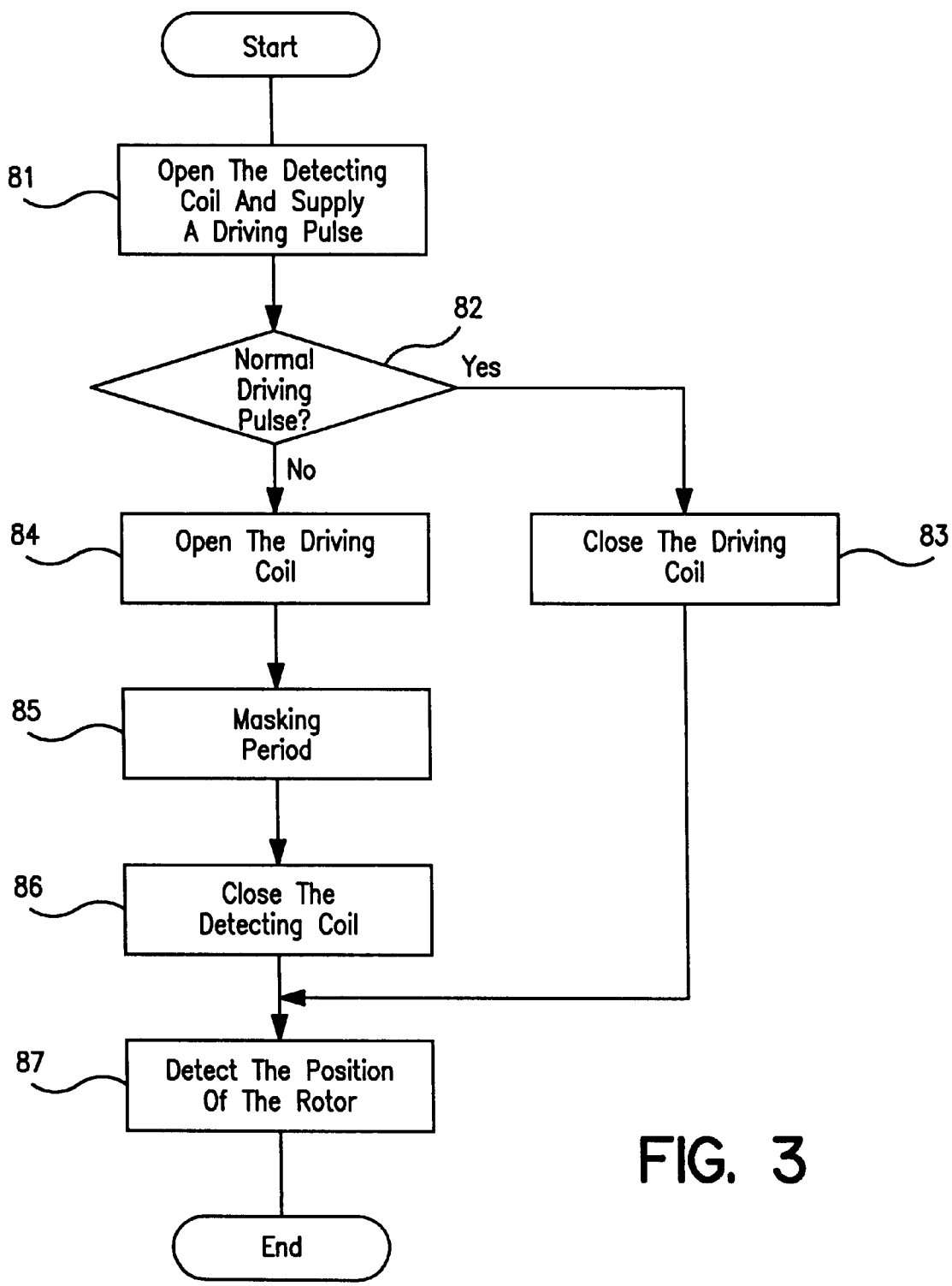
FIG. 3 is a flow chart illustrating a method of controlling the rotation of the rotor of the timepiece device shown in FIG. 1 by supplying driving pulses.

FIG. 3 illustrates, in a brief fashion, the method of controlling the driving coil 11 and the detecting coil 71 using the controller 20 according to the present embodiment. First, in step 81, the detecting coil control circuit 76 opens the detecting coil 71, and the driving controller 25 supplies, with proper timing, a normal driving pulse DP, with a proper effective power, or a quick driving pulse JP. Then in step 82, the driving controller 25 determines the manner in which the following operation is performed, depending on the type of the driving pulse supplied. If the driving pulse supplied is a normal driving pulse DP, then the process goes to step 83. In step 83, the driving coil 11 is closed so that a current is passed through the driving coil 11 by a back electromotive force created by rotation of the rotor 13 thereby producing an electromagnetic braking force.

On the other hand, in the case where it is determined in step 82 that a quick driving pulse JP has been supplied, the process goes to step 84. In step 84, the driving coil 11 is opened so that no electromagnetic braking force is generated by the driving coil 11. In the next step 85, the driving controller 25 provides a masking period during which both the driving coil 11 and the detecting coil 71 are maintained opened. After that, in step 86, the detecting coil control circuit 76 closes the detecting coil 71 so that a back electromotive force is generated in the detecting coil 71.

In step 87, the position detecting circuit 77 detects the position of the rotor 13 and determines whether or not the rotor 13 has been successfully driven to rotate. Herein, in the case where a normal driving pulse DP has been supplied, the position detecting circuit 77 detects the position of the rotor 13 on the basis of the back electromotive force generated in the driving coil 11. However, in the case where a quick driving pulse JP has been supplied, the position detecting circuit 77 detects the position of the rotor 13 on the basis of the back electromotive force generated in the detecting coil 71.

Figure 4:
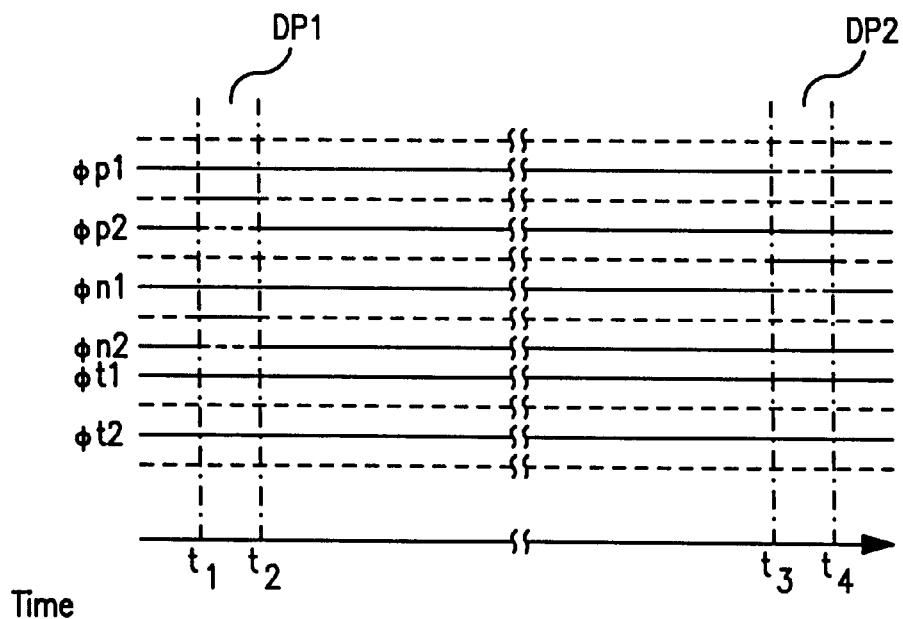
FIG. 4 is a timing chart associated with the process of supplying normal driving pulses.
Figure 5:
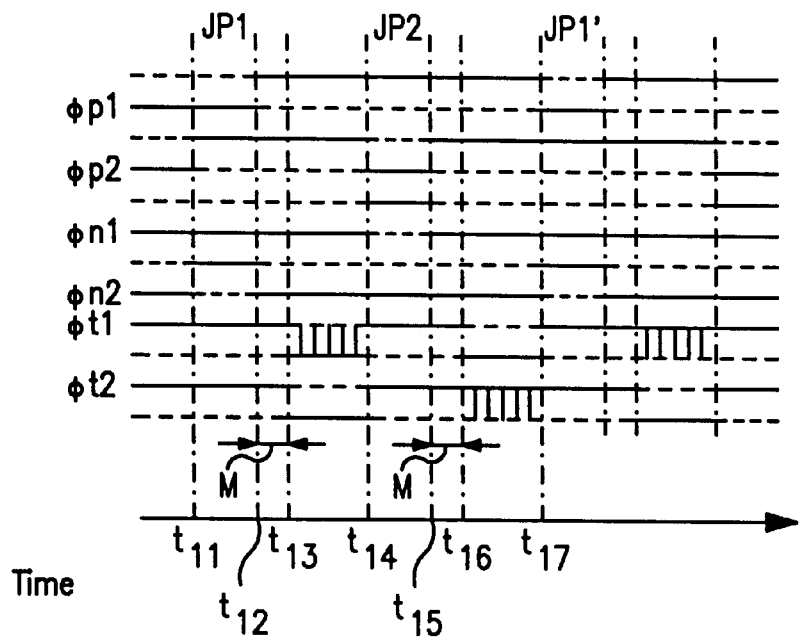
FIG. 5 is a timing chart associated with the process of supplying quick driving pulses.

FIGS. 4 and 5 are timing charts illustrating the process of controlling the respective MOSFETs of the driving circuit 30 and those of the connection circuit 72 so as to perform the above-described operation. FIG. 4 is a timing chart associated with normal driving pulses DP. Before a normal driving pulse DP is supplied at time t1, control signals $\phi$p1 and $\phi$p2 supplied to the p-channel MOSFETs 32a and 32b of the driving circuit 30 are at low levels, and thus the MOSFETs 32a and 32b are in an on-state. Therefore, the driving coil 11 is closed via the MOSFETs 32a and 32b. On the other hand, control signals $\phi$n1 and $\phi$n2 supplied to the n-channel MOSFETs 33a and 33b of the driving circuit 30 are at low levels, and thus the MOSFETs 33a and 33b are in an off-state. Control signals $\phi$t1 and $\phi$t2 supplied to the p-channel MOSFETs 72a and 72b of the connection circuit 72 are at high levels, and thus the MOSFETs 72a and 72b are in an off-state. Therefore, the detecting coil 71 is in an open state.

In the timepiece device 1, the driving pulses DP for driving the hands in the normal mode are supplied at 1 Hz to the stepping motor 10. Thus, at time t1 with timing of 1 Hz, the control signal $\phi$p2 is changed to a high level thereby turning off the MOSFET 32b, and the control signal $\phi$n2 is changed to a high level thereby turning on the MOSFET 33b. As a result, the MOSFETs 32a and 33b are turned on, and electric power corresponding to the driving pulse DP1 is supplied to the driving coil 11 thereby driving the rotor 12 to rotate. During the above processing step, the control signals $\phi$t1 and $\phi$t2 are maintained at the high levels. Therefore, the detecting coil 71 remains open, and thus no current due to a back electromotive force flows through the detecting coil 71.

At time t2 after the driving pulse DP1 was supplied, the control signals $\phi$p2 and $\phi$n2 become low. As a result, the MOSFET 32b is turned on and the MOSFET 33b is turned off thereby closing the driving coil 11. As a result, a current due to a back electromotive force is passed through the driving coil 11, and thus the driving coil 11 functions as an electromagnetic brake thereby ensuring that the rotor 13 is stopped in a proper position after rotating a predetermined angle, preferably 180°. After time t2, the voltage or current induced in the driving coil 11 by the back electromotive force is detected by the position detecting circuit 77 so as to determine whether or not the rotor 13 has been successfully rotated. If the rotor 13 failed to rotate adequately, an auxiliary pulse with a greater effective power than the normal driving pulse DP is supplied so as to force the rotor 13 to rotate.

During the above process, the MOSFETs 73a and 73b of the connection circuit 72 are maintained in the off-state. Therefore, in the present embodiment, the detecting coil 71 is not closed during the period in which the normal driving pulse DP is supplied, and the detecting coil 71 is not used to detect the rotation and no electromagnetic braking force is generated during this period. Alternatively, the detecting coil 71 may be closed by changing the control signals $\phi$t1 and $\phi$t2 to low levels when a proper time has elapsed after the driving pulse DP was supplied. In this case, the detecting coil 71 can serve as an auxiliary electromagnetic brake, and a voltage or current induced by the back electromotive force in the detecting coil 71 can be detected by the position detecting circuit 77. However, the driving coil 11 is also in the closed state, and a greater voltage or current is generated in the driving coil 11 by the back electromotive force than is generated in the detecting coil 71. Therefore, when the hands 61–63 are driven in the normal mode, it is desirable to employ the current or voltage induced in the driving coil 11 by the back electromotive force to detect the position of the rotor. At time t3, when 1 sec has elapsed since time t1, the control signals $\phi$p1 and $\phi$n2 are changed to high levels thereby supplying a driving pulse DP2 with a polarity opposite to that of the previous driving pulse DP1 to the stepping motor 10 thereby driving the rotor 13 to further rotate a predetermined angle, preferably 180°. At time t4 after the driving pulse DP2 was supplied, the control signals $\phi$p1 and $\phi$n1 are again changed to the low levels, and thus the driving coil 11 is closed. As a result, the rotor 13 comes to rest in a 180°-rotated position in a similar manner as described above, and whether or not the rotor 12 has been successfully rotated to the proper position is determined by detecting a current or voltage induced in the driving coil 11 by a back electromotive force. In the above process, the control signals φp1 and φp2 may be chopped with proper timing so that the voltage induced in the driving coil 11 by the back electromotive force is amplified by means of chopper-assisted amplification thereby ensuring that the position of the rotor is detected in a more reliable fashion.

FIG. 5 is a timing chart associated with quick driving pulses JP. Initially, the control signals φp1 and φp2 supplied to the p-channel MOSFETs 32a and 32b of the driving circuit 30 are at low levels and thus the driving coil 11 is maintained in the closed state. If a quick driving operation is started at time t11, the control signals φp2 and φn2 become high and the MOSFETs 32a and 33b are turned on thereby supplying a quick driving pulse JP1 to the stepping motor 10. Herein, the control signals φt1 and φt2 are maintained at the high levels so that the detecting coil 71 remains in the open state. Therefore, no current due to a back electromotive force flows through the detecting coil 71 and thus no electromagnetic braking force is generated. At time t12 after the quick driving pulse JP1, having sufficient effective power required to drive the rotor 13 in the quick driving mode, was supplied to the driving coil 11, the control signal φp1 is changed to a high level and the control signal φn2 is changed to a low level thereby making the driving coil 11 open so that no current due to a back electromotive force flows through the driving coil 11 and thus no electromagnetic braking force is generated by the driving coil 11.

During a masking period M after time t12, both the driving coil 11 and the detecting coil 71 are maintained open. At time t13 after the expiration of the masking period M, the control signals φt1 and φt2 are changed to low levels thereby turning on the MOSFETs 73a and 73b of the connection circuit 72. As a result, the detecting circuit 71 is closed, and a current due to a back electromotive force flows through the detecting coil 71. In the above process, the control signal φt1 supplied to the MOSFET 73a serves as a chopping signal, and thus the current due to the back electromotive force is passed through the detecting coil 71 in a chopped fashion. Thus, the voltage induced by the electromotive force is amplified by means of chopper-assisted amplification. Thus, the position detecting circuit 77 can detect the position of the rotor 13 on the basis of the voltage induced in the detecting coil 71 by the back electromotive force.

Figure 6:
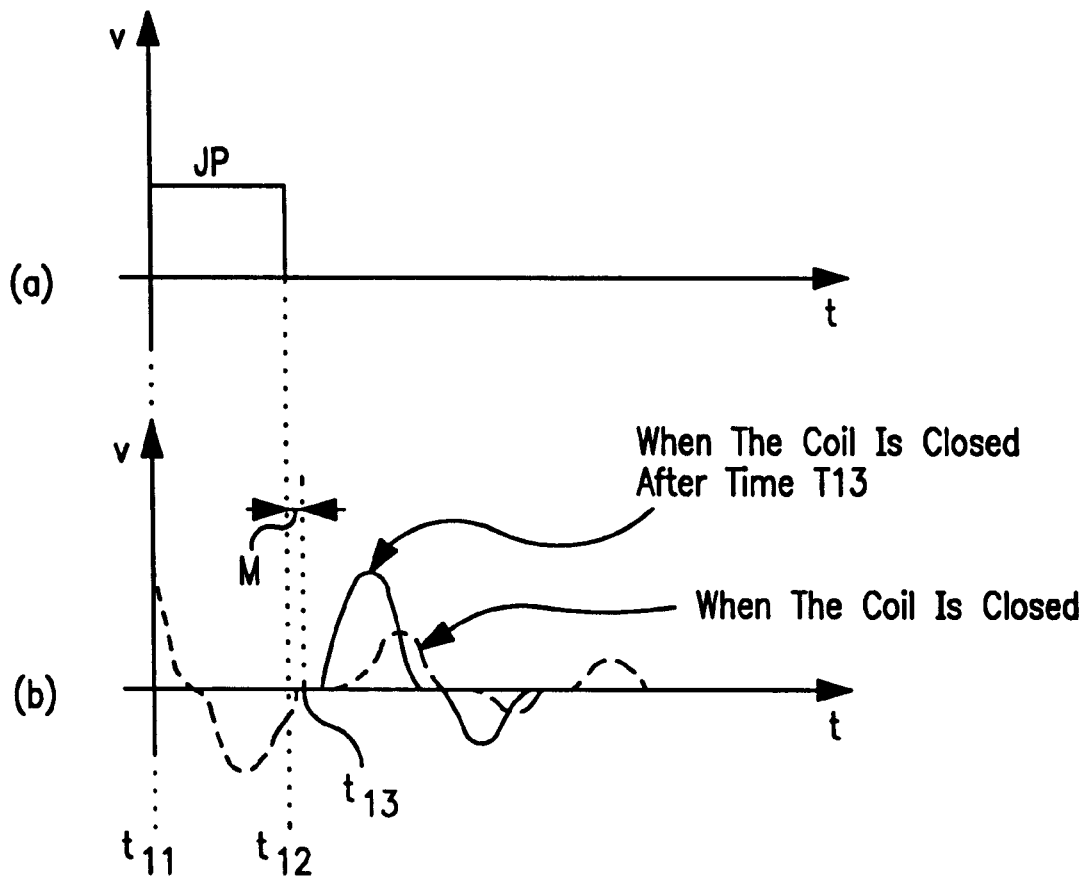
FIG. 6 is a graph illustrating a voltage induced in a detecting coil by a back electromotive force.

FIG. 6 schematically illustrates voltages induced in the detecting coil 71 when the driving pulse JP is supplied to the driving coil 11. In FIG. 6, the broken line represents a voltage induced by a back electromotive force for the case where the detecting coil 71 is in the closed state, whereas the solid line represents a voltage induced by a back electromotive force after the detecting coil 71 is closed at time t13 at the expiration of the masking period M. As can be seen from FIG. 6, the detecting coil 71 provided separately from the driving coil 11 serves to reduce the influence of a transient phenomenon, such as that shown in FIG. 8, caused by the driving pulse. However, if the detecting coil 71 is always in the closed state, the back electromotive force due to the driving pulse JP causes the detecting coil 71 to act as an electromagnetic brake. Furthermore, spikes are generated at on-off transients of the driving pulse JP. For the above reason, it is not desirable to always maintain the detecting coil 71 in the closed state during the quick driving operation in which the rotor 13 is rotated at a high speed. Another problem is that it is difficult to detect the position of the rotor 13 immediately after supplying the driving pulse JP.

In contrast, if the detecting coil 71 is maintained in the open state until it is closed at time t13, the detecting coil 71 is prevented from acting as an electromagnetic brake during the period in which the driving pulse JP is supplied. Furthermore, the influence of spikes is minimized by providing the masking period M. If the detecting coil 71 is closed just before a first peak (with the same polarity as that of the driving pulse) appears in the voltage induced in the detecting coil by the back electromagnetic force, it is possible to obtain an increased peak value. Thus, when the position detecting circuit 77 detects the position of the rotor 13 on the basis of the peak level, the presence and the absence of a peak can be determined clearly. This ensures that the position of the rotor can be determined precisely relatively quickly after the delivery of the pulse JP. Furthermore, it is possible to obtain a peak value further increased by amplifying the voltage induced by the back electromotive force by means of chopper-assisted amplification. Also in the case where the position detecting circuit 77 is designed to determine the position of the rotor on the basis of a transition of polarity (that is, a zero-crossing point) of the voltage due to the back electromotive force, it is possible to prevent problems of spikes and also possible to obtain an increased peak value. Thus, it is possible to clearly detect the timing of the transition in polarity of the voltage, and, to precisely detect the position of the rotor 13 at an earlier stage.

Furthermore, because the position of the rotor 13 is detected using the detecting coil 71, it is possible to open the driving coil 11 so that no current due to the back electromotive force flows through the driving coil 11 during the period in which the position is detected. This prevents the driving coil 11 from acting as the electromagnetic brake, and thus the rotor is allowed to rotate at a high speed with low energy.

Referring again to FIG. 5, if the position of the rotor 13 is determined on the basis of the voltage due to the back electromotive force detected via the detecting coil 71, the control signals φt1 and φt2 are made high so as to open the detecting coil 71. Furthermore, at time t14, the control signal φp2 is changed to a low level and the control signal φn1 is changed to a high level and they are maintained at the same levels until time t15 thereby supplying a quick driving pulse JP2 with a polarity opposite to that supplied at time t11. During a masking period after that, both the driving coil 11 and the detecting coil 71 are opened. At time t16 after the expiration of the masking period, the control signals φt1 and φt2 are made low thereby closing the detecting coil 71 to detect the position of the rotor 13. After time t17, the quick driving operation is continued by performing the above-described process repeatedly while monitoring the position of the rotor 13.

In the electronic watch 1 and the method of controlling the same according to the present embodiment, as described above, the detecting coil 71 is disposed separately from the driving coil 11, and the detecting coil 71 is closed only when the position of the rotor 13 is detected after each quick driving pulse JP is supplied. Thus, the detecting coil 71 does not generate an electromagnetic braking force which would interfere with the rotation of the rotor. In the operation in the quick driving mode, the rotation of the rotor 13 can be detected with early timing by the detecting coil 71 disposed separately from the driving coil 11 without being influenced by the driving pulse. This makes it possible to perform the quick driving operation in a stable fashion with low energy. On the other hand, the driving coil 11 is opened when no driving pulse JP is supplied so as to prevent the driving coil 11 from acting as an electromagnetic brake thereby preventing the driving coil 11 from interfering with the rotation of the rotor. This allows the rotor 13 to rotate at a high speed with still lower energy.

In the quick driving operation, as described above, the driving coil 11 is opened when the position of the rotor 13 is detected, whereas the detecting coil 71 is opened when a driving pulse is supplied, thereby minimizing the possibility that these coils act as an electromagnetic brake. Therefore, the driving coil 11 can be optimized taking into account only the conditions in which a driving pulse is supplied. For example, the diameter and the number of turns of the winding of the driving coil 11 may be set to generate a high enough magnetic field to drive the rotor 13. On the other hand, the diameter and the number of turns of the detecting coil 71 may be set to values which are suitable for detecting the back electromotive force and which allow the electromagnetic braking force to be minimized when the position of the rotor 13 is detected on the basis of a current induced by the back electromotive force in the detecting coil 71. The above-described optimization of the driving coil 11 and the detecting coil 71 also results in a reduction in the electric power required for the quick driving operation.

On the other hand, when a normal driving pulse DP is supplied, the driving coil 11 may be closed so as to intentionally make the driving coil 11 act as an electromagnetic brake which is effectively used in the operation. In the present invention, as described above, the driving coil and the detecting coil provided separately from each other are controlled in different manners depending on whether the operation is performed in the normal or quick driving mode such that the hands 61–63 are properly driven in a stable manner in both the normal and quick driving modes.

The waveforms of the driving pulses DP and JP and the waveforms of other control signals described above are only for the purpose of illustration. The waveforms of these signals may be modified depending on the characteristics of the stepping motor 10 or the circuit configuration of the driving circuit employed in a specific timepiece device. Although a two-phase stepping motor suitable for use in a timepiece device is employed, by way of example, in the embodiment described above, a stepping motor with three or more phases may also be employed. Furthermore, the method of driving the stepping motor is not limited to the one-phase excitation. Two-phase excitation or one/two-phase excitation may also be employed. The application of the present invention is not limited to timepiece devices such as a wristwatch but is applicable to multifunction clocks, such as a chronograph, and also to other various electronic devices which include a stepping motor.

As described above, the present invention has great advantages. That is, when the stepping motor including the driving coil and the detecting coil is driven, the detecting coil is maintained in an open state during the period in which a normal driving pulse is being supplied to the driving coil thereby preventing the detecting coil from acting as an electromagnetic brake. In the quick driving operation in which the stepping motor is driven at a high speed, the driving coil is opened when the position of the rotor is detected thereby minimizing the chance that the driving coil acts as the electromagnetic brake, while the detecting coil is closed so as to detect the position of the rotor with early timing. This allows the rotor to be driven to rotate at a high speed in a stable fashion with reduced power. Thus, the electronic device and the method of controlling the electronic device according to the present invention can be advantageously applied to a timepiece device or other devices having the capability of adjusting the hour and minute hands by quickly driving a stepping motor.

Figure 7:
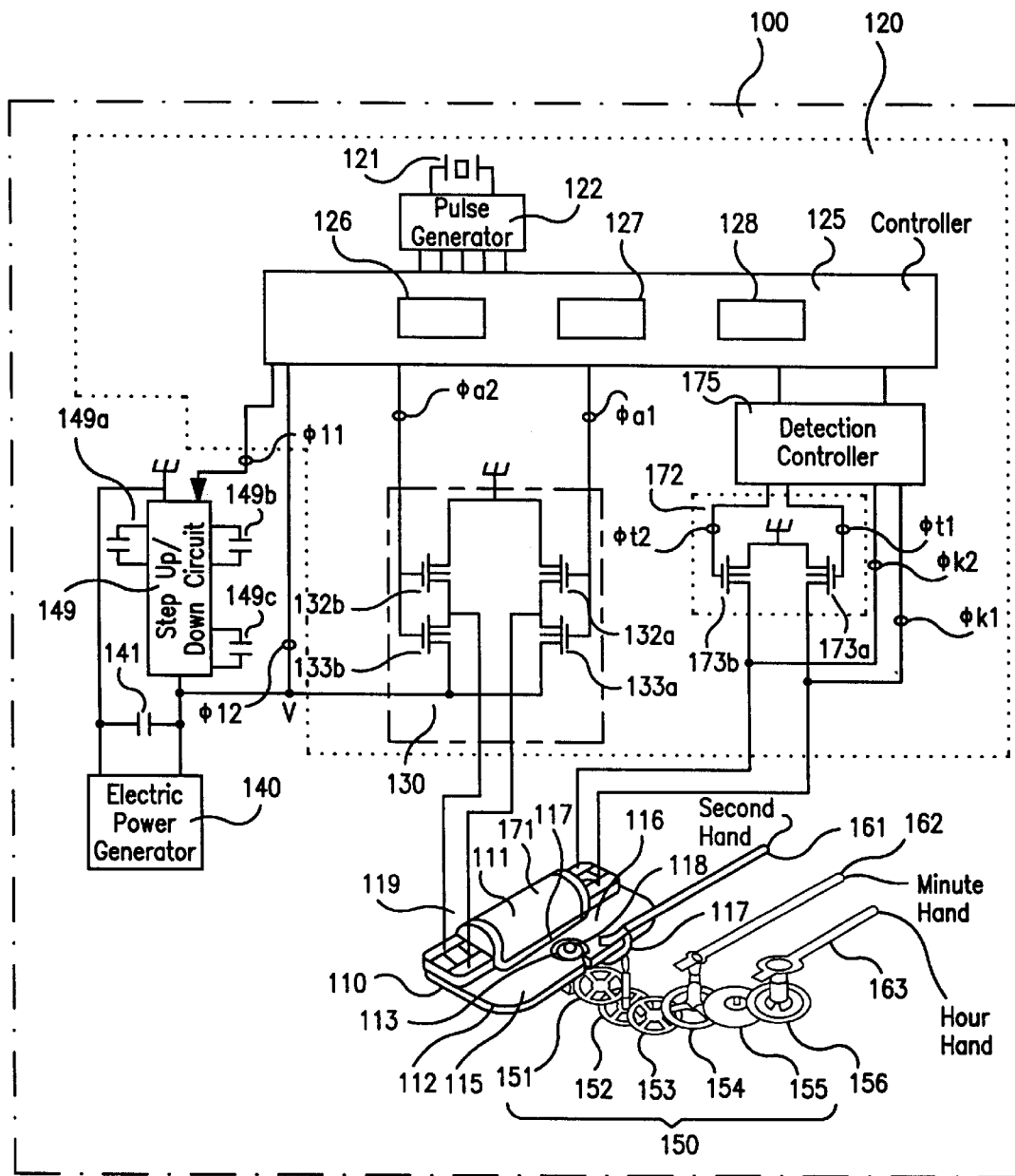
FIG. 7 is a schematic diagram illustrating a further embodiment of a timepiece device including a stepping motor, according to the present invention.

Referring by example to another timepiece device 100, FIG. 7 illustrates a further embodiment of the subject invention. The timepiece device 100 includes a stepping motor 110, a controller 120 for driving the stepping motor 110, a wheel train 150 for transmitting the motion of the stepping motor 110, and a second hand 161, a minute hand 162, and a hour hand 163 which are driven by the wheel train 150. The stepping motor 110 includes: a driving coil 111 which generates a magnetic force when a driving pulse is supplied from the controller 120 to the driving coil 111; a stator 112 excited by the driving coil 111; and a rotor 113 which is located in a space surrounded by the stator 112 and which is rotated by a magnetic field generated by the stator 112, wherein the rotor 113 is formed of a disk-shaped two-pole permanent magnet. In the stator 112, a magnetic saturation part 117 is formed such that a magnetic force generated by the driving coil 111 creates opposite magnetic poles at proper locations 115 and 116 on the perimeter around the rotor 113. Furthermore, the stator 112 also includes an inner notch 118 formed at a proper location on the inner wall of the stator 112 such that a cogging torque produced by the presence of the inner notch 118 causes the rotor 113 to come to rest in a proper position which determines the direction of rotation of the rotor 113.

As in the previous embodiment, the rotation of the rotor 113 of the stepping motor 110 is transmitted to the respective hands 161–163 via the wheel train 150 consisting of a fifth wheel 151, a fourth wheel 152, a third wheel 153, a second wheel 154, a minute wheel 155, and hour wheel 156. A second hand 161 is connected to the fourth wheel 152, and a minute hand 162 is connected to the second wheel 154. A hour hand 163 is connected to the hour wheel 156. The time is represented by these hands in response to the rotation of the rotor 113. The wheel train 150 may also be connected to a transmission system (not shown) for indicating the year, month, and day.

In the timepiece device 100, driving pulses are periodically generated at a frequency of 1 Hz by dividing a signal at a reference frequency and supplied to the stepping motor 110 thereby driving the hands such that the current time is indicated by the hands 161–163. The controller 120 employed in the present embodiment to control the stepping motor 110 includes a pulse generator 122 for generating pulses at the reference frequency using a reference oscillator 121 such as a quartz oscillator and also various pulses different in pulse width or timing. A controller 120 also includes a driving controller 125 for controlling the stepping motor 110 in accordance with various pulse signals supplied from the pulse generator 122, and a detecting circuit 175 for detecting the rotation of the rotor 113.

The driving controller 125 includes: a functional part 126 for supplying normal driving pulses at a frequency of 1 Hz to the driving coil 111 via a driving circuit 130, which will be described later, thereby driving the rotor 113 of the stepping motor 110 in the normal hand driving mode; and an auxiliary functional part 127 for outputting an auxiliary pulse with greater effective power than that of normal driving pulses for when the rotor fails to rotate. Furthermore, in the present embodiment, the driving controller 125 further includes a quick driving control part 128 for supplying quick driving pulses PW at intervals shorter than the intervals at which the normal driving pulses are supplied in the normal hand driving mode. That is, in the present embodiment, the driving controller 125 can drive the stepping motor at a high speed, using quick driving pulses PW, in the same or opposite direction as which the stepping motor 110 is driven in the normal hand driving mode.

In accordance with control signals φo1 and φo2, which are supplied by the driving controller 125, the driving circuit 130 supplies various driving pulses to the stepping motor 110. The driving circuit 130 includes a p-channel MOSFET 132a, a n-channel MOSFET 133a, a p-channel MOSFET 132b, and a p-channel MOSFET 133b wherein the p-channel MOSFET 132a and the n-channel MOSFET 133a are connected in series and the p-channel MOSFET 132b and the p-channel MOSFET 133b are connected in series. Electric power supplied from a power supply 141 to the driving coil 111 of the stepping motor 110 is controlled by the MOSFETs 132a, 133a, 132b, 133b.

In the present embodiment, as with the prior embodiment, the stepping motor 110 includes a coil part 119 around which a detecting coil 171, as well the driving coil 111, is wound. The detecting coil 171 is connected to a connection circuit 172. The connection circuit 172 includes p-channel MOSFETs 173a and 173b that are connected in parallel and controlled by control signals φt1 and φt2, respectively, supplied from a detection controller 175. The connection circuit 172 closes the detecting coil 171 after a driving pulse has been supplied. Furthermore, the connection circuit 172 chops the back electromotive force generated in the detecting coil 171 so that the back electromotive force is amplified by means of chopper-assisted amplification. Voltages φk1 and φk2, obtained by the chopper-assisted amplification, are fed back to the detection controller 175. The detection controller 175 determines whether or not the rotor has been rotated on the basis of the detection signals φk1 and φk2.

The timepiece device 100 of the present embodiment includes an electric power generator 140 for charging the power supply 141, and a step-up/down circuit 149 for generating a stepped-up/down voltage from the voltage supplied from the power supply 141. The step-up/down circuit 149 supplies the resultant voltage to the driving circuit 130 of the controller 120. The step-up/down circuit 149 of the present embodiment is capable of stepping up or down the given voltage using a plurality of capacitors 149a, 149b, and 149c in a multiple stage fashion. In response to a control signal 11 supplied from the driving controller 125 of the controller 120, the step-up/down circuit 149 adjusts the voltage supplied to the driving circuit 130. The output voltage of the step-up/down circuit 149 is also supplied to the driving controller 125 via a monitor circuit φ12 so that the power supply voltage can be monitored. The voltage of the quick driving pulse PW, as well as the voltage of the normal driving pulse is controlled, and the effective power of the driving pules is controlled by adjusting the pulse width and the voltage of the driving pulses. Thus, it is possible to make a fine adjustment to the driving power so as to optimize the electric power of the driving pulses supplied to the rotor such that the rotor 113 can be driven at a high speed with reduced power consumption.

Figure 8:
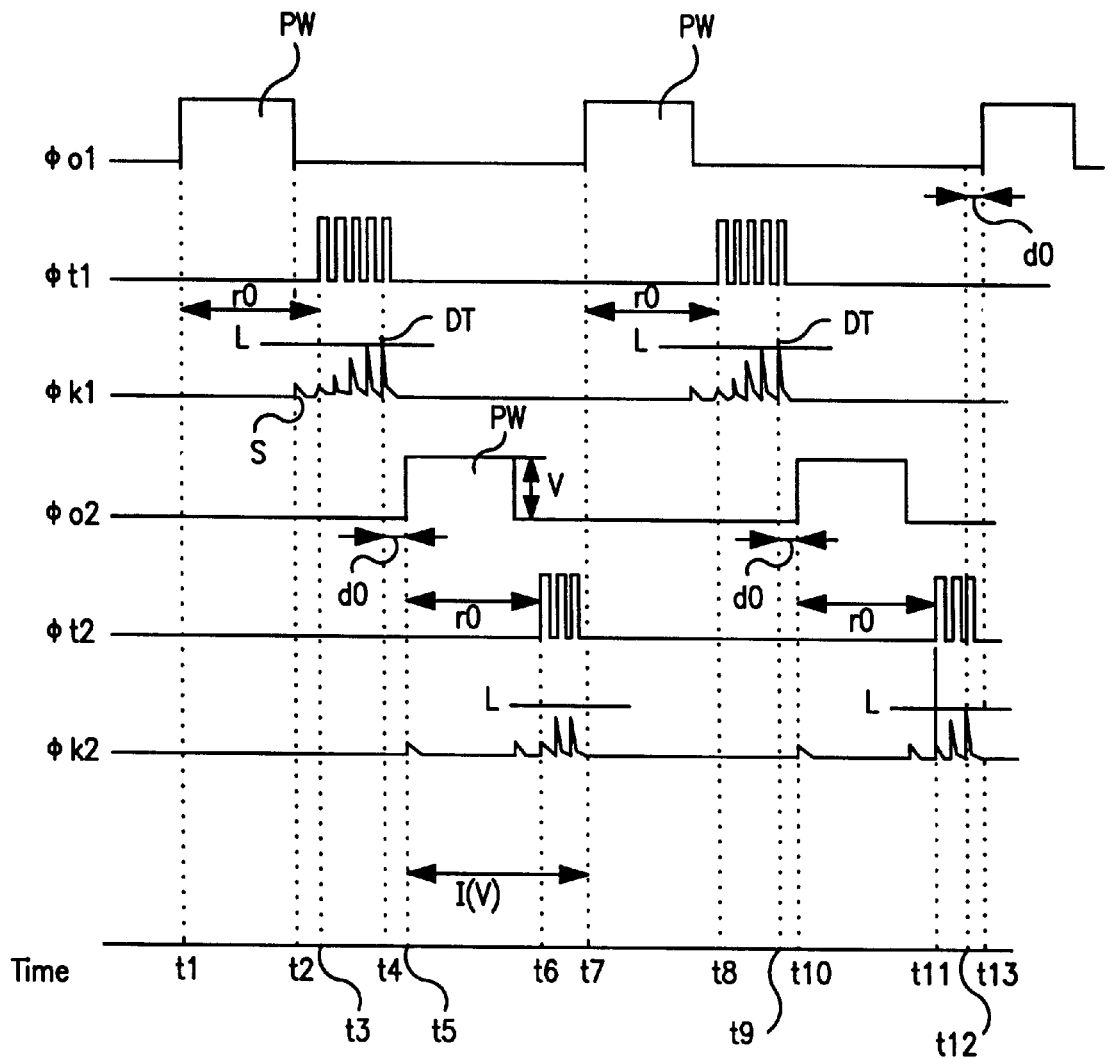
FIG. 8 is a timing chart illustrating a quick driving operation performed under the control of the driving controller shown in FIG. 7.

FIG. 8 is a timing chart illustrating the manner in which quick driving pulses PW are supplied to the driving coil 111 so as to perform the quick driving operation. In the present embodiment, as can be seen from FIG. 8, the quick driving operation is performed by supplying driving pulses PW not at fixed intervals, but at varying intervals determined on the basis of the rotation timing of the rotor 113, which is detected by detecting a voltage φk1 induced in the detecting coil 171 by a back electromotive force. More specifically, a phenomenon associated with the rotation of the rotor 113 is detected, and a driving pulse PW is supplied immediately after the phenomenon is detected (for example at time t4, wherein the timing when the phenomenon is detected is herein referred to as the "detection timing" (DT)) or after a predetermined delay time d0 has elapsed since the detection. This method is herein referred to as a self-excited driving method. This technique makes it possible to perform the quick driving operation in a manner optimized for a particular stepping motor. Because the position of the rotor 113 is monitored, it is possible to supply a driving pulse when the rotor 113 comes into a particular position. This allows the rotor to be driven without causing the driving pulse to brake the rotor 113. Furthermore, it becomes possible to prevent the driving pulse from becoming out of phase with the position of the rotor 113 thereby preventing the effective power of the driving pulse from becoming insufficient to drive the rotor. Thus, the quick driving operation can be performed with low power in a highly reliable fashion.

Figure 14:
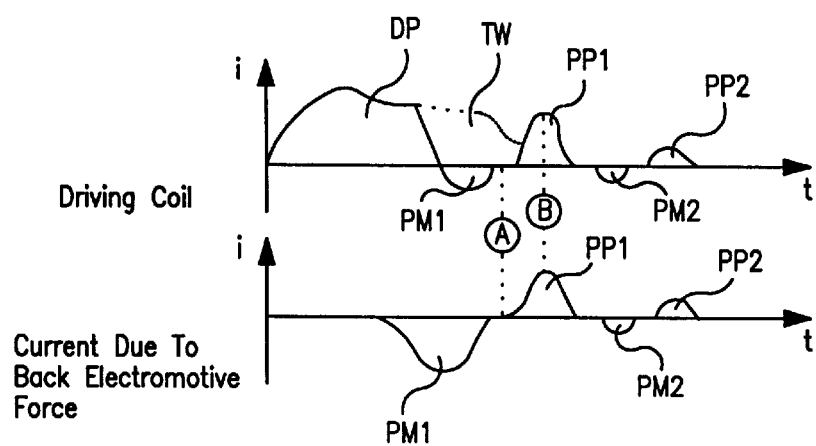
FIG. 14 is a graph illustrating a current flowing through a driving coil when the rotor rotates in the manner as shown in FIG. 13 and also illustrating a current induced by an electromotive force caused by the rotation.

With reference to FIG. 14, the detection timing DT may be obtained by detecting a first peak PP1, having the same polarity as that of the driving pulse, appearing in the voltage induced by the back electromotive force generated by the rotation of the rotor 113, or by detecting a zero-crossing point of the induced voltage by monitoring the polarity of the induced voltage. The "detection timing" is the point at which a phenomen is noted associated with the rotation of the rotor; the phenomen may be a maximum voltage or a change in polarity or other notable change in voltage associated with the rotor rotation. In the present embodiment of the subject invention, the first peak (referred to as "PP1" in FIG. 14) in the induced voltage is chopper-amplified, and the time when the amplified voltage reaches a predetermined value L is preferably employed as the detection timing DT, although the invention is not limited to this method. Alternatively, another phenomenon (other than the first peak PP1) may be employed to detect the position of the rotor 113, and the driving pulse may be supplied with proper timing determined on the basis of the detected phenomenon.

Figure 9:
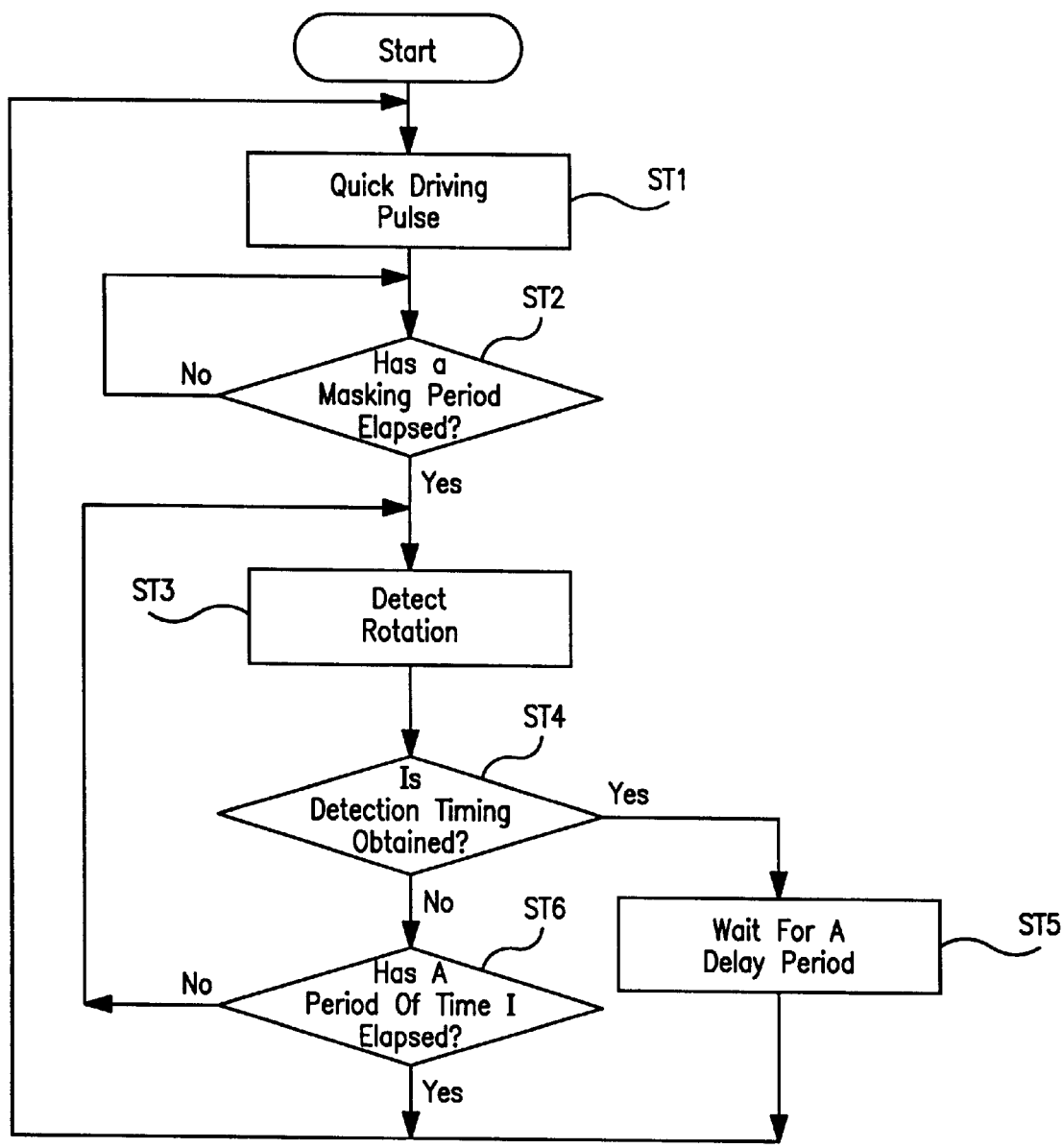
FIG. 9 is a flow chart associated with the quick driving operation shown in FIG. 8.

FIG. 9 is flow chart illustrating the process associated with the quick driving control part 128 of the driving controller 125. First, in step ST1, a quick driving pulse PW is outputted. In step ST2, a masking period τ0 is provided to avoid the problems of spikes induced in the detecting coil by the driving pulse. In step ST3, the detecting coil 171 is closed via the connection circuit 172, and the back electromotive force generated in the detecting coil 171 is amplified by means of chopper-assisted amplification. In step ST4, if the chopper-amplified voltage reaches a predetermined level L (i.e. detection timing DT is reached), then the process goes to step ST5. The process waits in step ST5 for a predetermined delay time d0. After expiration of the delay time d0, the process returns to step ST1 so as to output a driving pulse PW with an opposite polarity. Thus, the rotor 113 is driven so as to rotate at a speed which is determined by the effective power of driving pulses and the conditions of the stepping motor 110.

There is a possibility that step ST3 fails to detect the rotation of the rotor 113. In this case, no detection timing DT is obtained. In the present embodiment, to avoid the problem caused by such a detection failure, if a predetermined period of time I has elapsed in step ST6, the process is forced to return to step ST1. In step ST1, a driving pulse PW with an opposite polarity is supplied so as to continue the quick driving operation. The period of time I which is evaluated in step ST6 is varied in accordance with the power supply voltage V which generates the driving pulses PW so that even when the detection timing DT fails to be detected, a next driving pulse PW is supplied, with sufficiently good timing, to correspond to the motion of the rotor 113 thereby ensuring that the quick driving operation is performed in a highly reliable fashion even if detection timing DT is not obtained sometimes.

Figure 10:
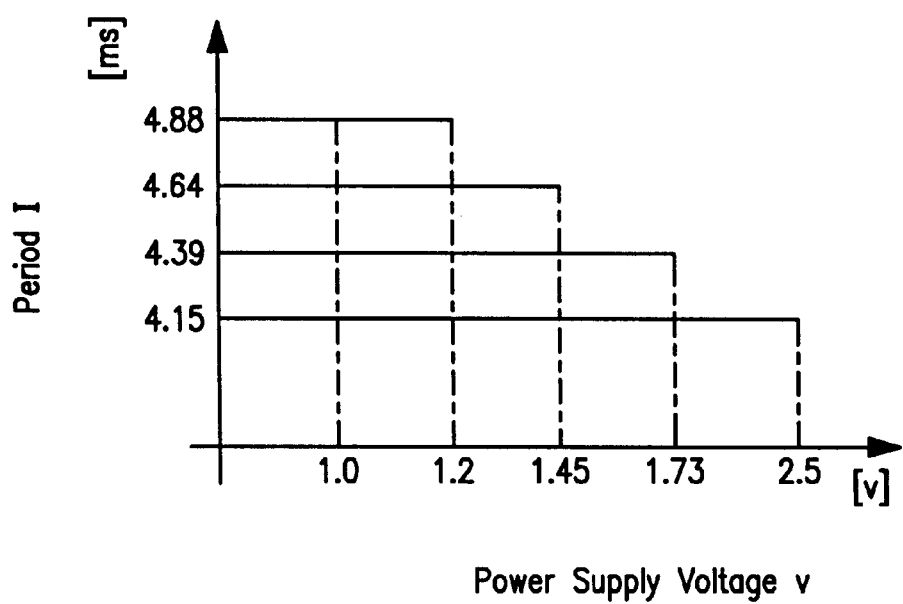
FIG. 10 is a graph illustrating the period of time determined depending on the power supply voltage of driving pulses.

FIG. 10 is a graph illustrating the period of time I determined by the quick driving control part 128 in accordance with the power supply voltage V. When the power supply voltage V is high, the driving pulse PW has a large effective power which causes the rotor 113 to rotate at a high speed. In this case, the rotation speed of the rotor 113 tends to increase. Conversely, when the power supply voltage V is low, the driving pulse PW has a low effective power which causes the rotor 113 to rotate at a low speed. In this case, the rotation speed of the rotor 113 tends to decrease. In view of the above, the quick driving control part 128 of the present embodiment sets the period of time I to a large value (i.e. longer period) when the power supply voltage V is low, so that when the detection timing DT is not obtained, a next driving pulse PW is supplied with slow timing. On the other hand, when the power supply voltage V is high, the period of time I is set to a small value (i.e., a shorter period) so that when the detection timing DT is not obtained, a next driving pulse PW is supplied with quick timing.

Referring to the timing chart shown in FIG. 8, the process of supplying the driving pulses PW under the control of the driving controller 125 in the timepiece device 100 of the present embodiment is described in further detail below. After a quick driving pulse PW is supplied at time t1 in step ST1, and if the driving pulse PW becomes low at time t2, then step ST2 provides a masking period τ0 extending from time t1. In the next step St3, the detecting coil 171 is closed at time t3, and a voltage induced by a back electromotive force in detecting coil 171 is detected. The masking period τ0 prevents noise in the form of spikes induced by the driving pulse PW from being chopper-amplified thereby ensuring that highly reliable detection timing DT can be obtained. If the detection timing DT is obtained at time t4 in step ST4 (i.e., the chopper-amplified voltage reaches the predetermined level L), then the process goes to step ST5 and waits for the delay time d0. At time t5 at the expiration of the delay time d0, a next driving pulse PW with an opposite polarity is supplied so as to continue the quick driving operation.

After the next driving pulse is supplied, a voltage induced by an electromotive force in the detecting coil 171 is detected at time t6 and chopper-amplified in a similar manner as described above. The resultant chopper-amplified voltage may be less than the level L for some reason, and no detection timing DT is obtained. In this case, if the period of time I (determined for the particular value of the power supply voltage V of the driving pulse PW) has elapsed in step ST6 from time t5 when the driving pulse PW was output, then the quick driving control part 128 terminates the detection of rotation of the rotor 113, and forces a next driving pulse PW to be output at time t7, after the expiration of the period of time I. In the above-described step ST6, the driving controller 125 monitors the power supply voltage via the signal φ12 and sets the period of time I to a value predetermined for the particular power supply voltage V as shown in FIG. 10, wherein the correspondence between the period of time I and the power supply voltage V defined in the graph in FIG. 10 may be stored in the form of a table or a function I(V). As a result, the timing of forcedly supplying a next driving pulse PW with an opposite polarity in an auxiliary fashion varies depending on the power supply voltage of the driving pulse. More specifically, the timing becomes quick when the power supply voltage V is high, whereas the timing becomes slow when the power supply voltage is low. Thus, the next driving pulse PW can be supplied with sufficiently good timing corresponding to the angular position of the rotor 113 because there is a high correlation between the power supply voltage V and the rotation speed of the rotor 113 as described above, even though the timing is not as precise as can be obtained when the detection timing DT is obtained. Thus, the detection timing DT is obtained at time t9 after the rotation of the rotor was detected at time t8 associated with the above-described next driving pulse PW. After that, the detection timing DT can be obtained at time t12 in a similar manner and thus the quick driving operation can be continued successfully.

If the detection timing DT is not obtained, and if the next driving pulse with the opposite polarity is forcedly supplied with fixed timing regardless of the power supply voltage, it is impossible to drive the rotor 113 in a proper manner depending on the rotation speed of the rotor 113. More specifically, the timing of supplying the next driving pulse may be too early or late with respect to the angular position of the rotor 113. As a result, there is a possibility that the rotor 113 fails to properly rotate. Even if the rotor 113 can rotate, the timing of detecting the voltage induced by the next back electromotive force may become inaccurate. This can cause another timing error to occur. As a result, in this case, the quick driving operation is most likely to become unstable. In contrast, in the present embodiment of the subject invention, even when the detection timing is not obtained, the timing of supplying the driving pulse can be properly controlled on the basis of the factors associated with the rotation speed of the rotor 113 thereby ensuring that the quick driving process is performed in a highly reliable fashion.

Figure 11:
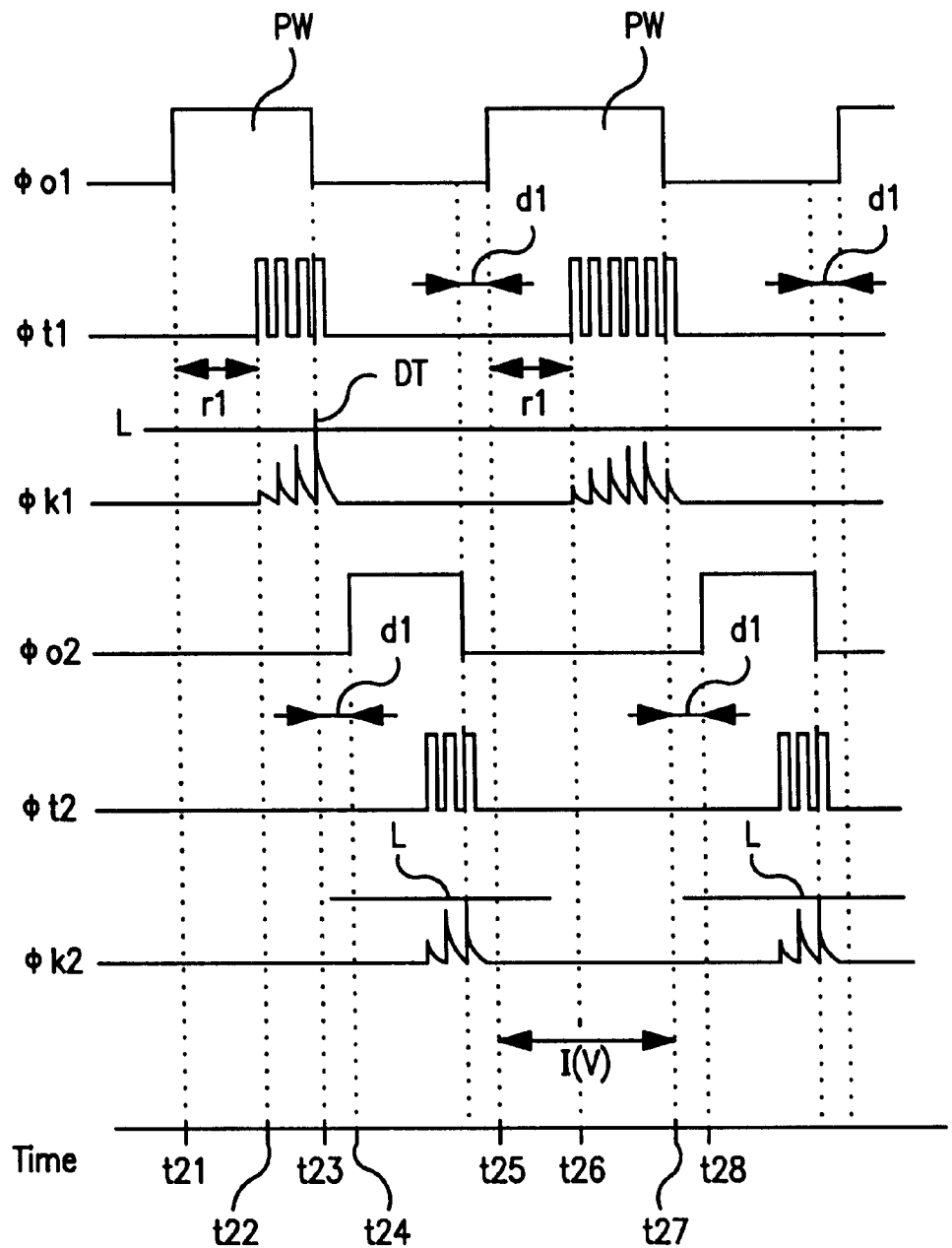
FIG. 11 is a timing chart illustrating another manner in which the quick driving operation is performed.
Figure 12:
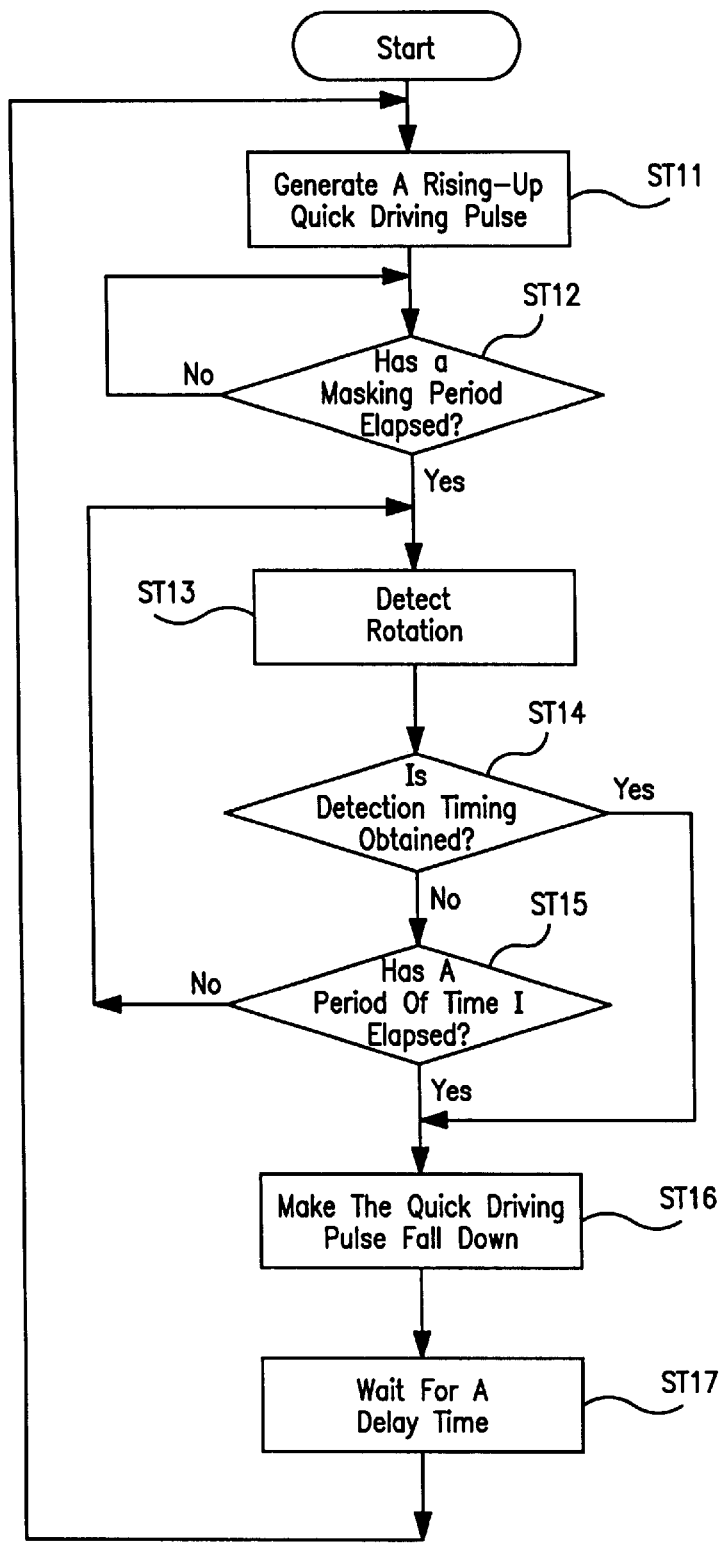
FIG. 12 is a flow chart associated with the quick driving operation shown in FIG. 11.
Figure 13:
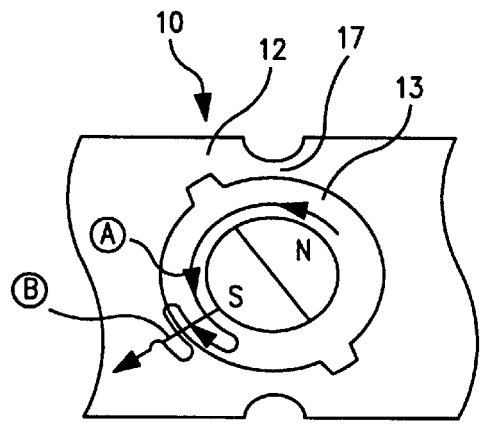
FIG. 13 is a schematic diagram illustrating the manner in which a rotor is rotated in a stator.

FIGS. 11 and 12 illustrate another method of supplying quick driving pulses. In this method, the rotation of the rotor 113 is detected after a quick driving pulse PW has become high, and the driving pulse PW is reduced to a low level at the time when the detection timing DT is obtained. Thus, the pulse width of the driving pulse PW is determined by the detection timing DT. As a result, the effective power of the driving pulse PW as well as the timing of outputting the driving pulse PW is controlled by the detection timing DT, that is, by the position of the rotor 113.

In the present embodiment, the quick driving control part 128 controls the stepping motor 110 as described below. First, in step ST11, a quick driving pulse PW is made to rise up to a high level at time t21. In the next step ST12, the process waits for a masking period τ1. In step ST13, the detection coil 171 is closed via the connection circuit 172 at time t22 and the rotation of the rotor 113 is detected. If detection timing DT is obtained at time t23 in step ST14, then the quick driving pulse PW is reduced to a low level in step ST16. After that, the process waits for a delay time d1 in step ST17. At the expiration of the delay time d1, the process returns to step ST11 in which a next driving pulse PW with an opposite polarity is made to rise up to a high level at time t24. That is, the driving pulse PW is supplied until the rotation of the rotor 113 is detected. When the rotation of the rotor 113 is detected, the driving pulse PW is stopped. After the delay time d1 has elapsed, a next driving pulse PW is supplied. Thus, driving pulses are supplied so that the effective power and the supplying timing thereof are properly varied in response to the conditions of the rotation of the rotor 113 of the stepping motor 110 thereby ensuring that the stepping motor is driven in the quick driving mode in a highly reliable fashion.

In this method of supplying quick driving pulses in the above-described manner, if the detection timing of the rotor 113 cannot be obtained for some reason, the driving pulse PW would be maintained at the high level, and thus the rotor 113 would be constrained to stop. On the other hand, if the timing of reducing the driving pulse PW is inaccurate, the effective power of the driving pulse PW becomes inconsistent with the rotation speed of the rotor 113, and the timing of supplying the next driving pulse becomes incorrect.

In the present embodiment of the subject invention, to avoid the above problems, if the detection timing is not obtained in step ST14, a particular period of time I is set in step ST15, and the driving pulse PW is reduced to the low level when the period of time I has elapsed. If the delay time d1 has further elapsed since then, a next driving pulse is made to rise up to the high level. The period of time I is varied as in the previous embodiment depending on the power supply voltage of the driving pulse so that the factors associated with the rotation speed of the rotor are reflected in the operation even when the detection timing is not obtained. For example, in FIG. 11, after the driving pulse PW became high at time t25, and the detection timing DT is not obtained, although the detection of the position of the rotor was started at time t26, the driving pulse PW is reduced to the low level at time t27 when the period of time I has elapsed since time t25, thereby determining the pulse width of the driving pulse PW. At time t28, after expiration of the delay time d1, a next driving pulse PW with an opposite polarity is made to rise up to the high level so as to continue the quick driving operation.

That is, in the method of the present embodiment, driving pulses with a small width are supplied at short intervals when the power supply voltage of the driving pulses is high, whereas driving pulses with a large width are supplied at long intervals when the power supply voltage is low. Because the rotor rotates at a high speed when the power supply voltage is high, the driving pulses supplied at short intervals match the rotation of the rotor. On the other hand, where the rotor rotates at a relatively low speed when the power supply voltage is low, the driving pulses supplied at long intervals match the rotation of the rotor. Furthermore, because the pulse width of the driving pulses becomes small when the power supply voltage is high and the pulse width becomes large when the power supply voltage is low, the effective power of the driving pulses becomes approximately constant. As a result, the quick driving operation is maintained in a stable fashion without producing an abrupt change in speed.

The power supply voltage V changes when the voltage of the battery varies. More specifically, in the present embodiment of the subject invention, the voltage of the power supply 141 varies depending on the degree to which the power supply 141 is charged by the electric power generator 140. Furthermore, in the timepiece device 100 of the present embodiment, the power supply voltage of the driving pulses is varied by the step-up/down circuit 149 when it is desired to increase or decrease the speed of the rotor or when it is desired to drive the rotor at a high speed in a highly reliable fashion. In any case, when the detection timing is not obtained, a driving pulse is supplied with timing that takes into account the power supply voltage, thereby ensuring that the quick driving operation is continued in a stable fashion.

The waveforms of the driving pulses PW and the chopper pulses described above are only for the purpose of illustration. The waveforms of these signals may be modified depending on the characteristics of the stepping motor 10 employed in a specific timepiece device. Although a two-phase stepping motor suitable for use in a timepiece device is employed, by way of example, in the embodiment described above, a stepping motor with three or more phases may also be employed. Furthermore, instead of controlling the operation in the same manner for any phase, the pulse width and the timing of supplying the driving pulse may be varied for each phase. Furthermore, the method of driving the stepping motor is not limited to the one-phase excitation. Two-phase excitation or one/two-phase excitation may also be employed. The application of the present invention is not limited to timepiece devices such as a wristwatch but is applicable to multifunction clocks, such as a chronograph, and also to other various electronic devices including a stepping motor.

As described above, the present embodiment of the subject invention has great advantages. That is, the power supply voltage of the driving pulses is employed as one of the factors according to which the timing of supplying the driving pulses is controlled. More specifically, when the rotor is driven at a high speed, not at fixed intervals, but at intervals determined in the self-excited driving fashion in which the position of the rotor is detected after supplying a driving pulse, and a next driving pulse is supplied with timing determined on the basis of the detection timing associated with the position of the rotor, even if it the position of the rotor fails to be detected, the timing of supplying a driving pulse can be determined taking into account the rotation speed of the rotor. Thus, it is possible to drive the stepping motor at a high speed in a stable fashion. Thus, the electronic device, and the method of controlling the electronic device, according to the present invention can be advantageously applied to a timepiece device or other devices having the capability of performing a time adjustment by quickly driving a stepping motor.

What is claimed is:

1. An electronic device comprising:
    a stepping motor including: a rotor magnetized in the form of a magnetic multipole; and a stator including a driving coil and a detecting coil, said rotor being rotatable in said stator;
    driving controller means for supplying a driving pulse to said driving coil to rotate said rotor;
    position detecting means for detecting a current induced in said detecting coil by a back electromotive force created by rotation of said rotor; and
    detecting coil controlling means for controlling said detecting coil such that said detecting coil is maintained in an open state when said driving pulse is being supplied to said driving coil and said detecting coil is closed when said driving pulse is turned off.

2. An electronic device according to claim 1, wherein said driving controller means is capable of supplying quick driving pulses and normal driving pulses, said quick driving pulses being supplied at intervals shorter than intervals at which normal driving pulses are supplied, and wherein said driving controller means opens said driving coil after supplying a quick driving pulse whereas said driving controller means closes said driving coil after supplying a normal driving pulse.

3. An electronic device according to claim 2, wherein said detecting coil controlling means closes said detecting coil after the expiration of a masking period during which said driving coil and said detecting coil are both maintained open.

4. A method of controlling an electronic device including a stepping motor, said stepping motor including a rotor magnetized in the form of a magnetic multipole and a stator including a driving coil and a detecting coil, said rotor being driven to rotate in said stator, said method comprising the steps of:

a driving step for opening said detecting coil and supplying a driving pulse to said driving coil to drive said rotor; and a position detecting step for closing said detecting coil and detecting a back electromotive force which is induced in said detecting coil by rotation of said rotor.

5. A method of controlling an electronic device, according to claim 4, wherein said driving step includes selectively supplying quick driving pulses and normal driving pulses, said quick driving pulses being supplied at intervals shorter than intervals at which said normal driving pulses are supplied, said driving step further comprising the steps of:

opening said driving coil after supplying one of said quick driving pulses; and closing said driving coil after supplying one of said normal driving pulses.

6. A method of controlling an electronic device, according to claim 5, further comprising the step of providing a masking period between said driving step and said position detecting step such that said driving coil and said detecting coil are both maintained open during said masking period.

7. An electronic device comprising:

a stepping motor including: a rotor magnetized in the form of a magnetic multipole, and a stator including a driving coil, said rotor being rotatable in said stator; and driving controller means for selectively supplying quick driving pulses and normal driving pulses to said driving coil to rotate said rotor, said quick driving pulses being supplied at intervals shorter than intervals at which said normal driving pulses are supplied, wherein said driving controller means opens said driving coil after supplying a quick driving pulse, whereas, said driving controller means closes said driving coil after supplying a normal driving pulse.

8. An electronic device according to claim 7, further comprising position detecting means for detecting a current induced in said driving coil by a back electromotive force created by rotation of said rotor.

9. A method of controlling an electronic device including a stepping motor, said stepping motor including a rotor magnetized in the form of a magnetic multipole and a stator including a driving coil, said rotor being driven to rotate in said stator, said method comprising the steps of:

selectively supplying quick driving pulses and normal driving pulses to said driving coil to drive said rotor, said quick driving pulses being supplied at intervals shorter than intervals at which said normal driving pulses are supplied;

opening said driving coil after supplying one of said quick driving pulses; and closing said driving coil after supplying one of said normal driving pulses.

10. A method of controlling an electronic device, according to claim 9, wherein the step of opening said driving coil after supplying one of said quick driving pulses further includes the steps of providing a detecting coil, and detecting a back electromotive force induced in said detecting coil by rotation of said rotor.

11. A method of controlling an electronic device, according to claim 10, wherein the step of closing said driving coil after supplying one of said normal driving pulses further includes detecting a back electromotive force induced in said driving coil by rotation of said rotor.

12. A method of controlling an electronic device, according to claim 9, wherein the step of closing said driving coil after supplying one of said normal driving pulses further includes detecting a back electromotive force induced in said driving coil by rotation of said rotor.

13. An electronic device comprising:

a stepping motor including: a rotor magnetized in the form of a magnetic multipole; and a stator including a driving coil and a detecting coil, said rotor being rotatable in said stator;

a driving controller supplying a driving pulse to said driving coil to rotate said rotor;

a position detecting circuit detecting a current induced in said detecting coil by a back electromotive force created by rotation of said rotor; and a detecting coil control circuit controlling said detecting coil such that said detecting coil is maintained in an open state when said driving pulse is being supplied to said driving coil and said detecting coil is closed when said driving pulse is turned off.

14. An electronic device according to claim 13, wherein said driving controller supplies quick driving pulses and normal driving pulses, said quick driving pulses being supplied at intervals shorter than intervals at which normal driving pulses are supplied, and wherein said driving controller opens said driving coil after supplying a quick driving pulse whereas said driving controller closes said driving coil after supplying a normal driving pulse.

15. An electronic device according to claim 14, wherein said detecting coil control circuit closes said detecting coil after the expiration of a masking period during which said driving coil and said detecting coil are both maintained open.

16. An electronic device comprising:

a stepping motor including: a rotor magnetized in the form of a magnetic multipole, and a stator including a driving coil, said rotor being rotatable in said stator; and a driving controller selectively supplying quick driving pulses and normal driving pulses to said driving coil to rotate said rotor, said quick driving pulses being supplied at intervals shorter than intervals at which said normal driving pulses are supplied, wherein said driving controller opens said driving coil after supplying a quick driving pulse, whereas, said driving controller closes said driving coil after supplying a normal driving pulse.

17. An electronic device according to claim 16, further comprising a position detecting circuit detecting a current induced in said driving coil by a back electromotive force created by rotation of said rotor.

18. An electronic device comprising:

a stepping motor including: a rotor magnetized in the form of a magnetic multipole; and a stator including a driving coil, said rotor being rotatable in said stator;

driving controller means for supplying a driving pulse to said driving coil to rotate said rotor; and electric power supplying means for serving as a power supply of said driving pulse, wherein said driving controller means is capable of changing the timing of supplying said driving pulse in accordance with the power supply voltage of said driving pulse.

19. An electronic device according to claim 18, wherein said driving controller means includes a quick driving controller for supplying quick driving pulses at intervals shorter than intervals at which normal driving pulses are supplied, and wherein said quick driving controller decreases the intervals between the quick driving pulses when said power supply voltage is high whereas said quick driving controller increases the intervals between the quick driving pulses when said power supply voltage is low.

20. An electronic device according to claim 19, further comprising position detecting means for detecting a back electromotive force induced by rotation of said rotor, wherein said quick driving controller determines the interval of said quick driving pulse in accordance with a detection timing detected by said position detecting means, and wherein when said detection timing is not obtained, said quick driving controller decreases the intervals between the quick driving pulses when said power supply voltage is high whereas said quick driving controller increases the intervals between the quick driving pulses when said power supply voltage is low.

21. An electronic device according to claim 19, further comprising position detecting means for detecting a back electromotive force induced by rotation of said rotor, wherein said quick driving controller determines the pulse width of said quick driving pulse in accordance with a detection timing detected by said position detecting means, and wherein when said detection timing is not obtained, said quick driving controller outputs a quick driving pulse with a small pulse width if said power supply voltage is high, whereas, said quick driving controller outputs a quick driving pulse with a large pulse width if said power supply voltage is low.

22. An electronic device according to claim 18, wherein said electric power supplying means includes voltage control means capable of increasing or decreasing said power supply voltage.

23. An electronic device according to claim 18, wherein the timing between supplying said driving pulses is changed.

24. An electronic device according to claim 18, wherein the timing of the duration of said driving pulses is changed.

25. A method of controlling an electronic device including a stepping motor, said stepping motor including a rotor magnetized in the form of a magnetic multipole and a stator including a driving coil, said rotor being driven to rotate in said stator, said method comprising a driving step for supplying a driving pulse to said driving coil to drive said rotor, wherein the timing of supplying said driving pulse is varied depending on the power supply voltage of the driving pulse.

26. A method of controlling an electronic device according to claim 25, wherein said driving step includes a quick driving step for supplying quick driving pulses at shorter intervals than the intervals at which normal driving pulses are supplied,
   and wherein in said quick driving step, the intervals between the quick driving pulses are decreased when said power supply voltage is high, whereas, the intervals between the quick driving pulses are increased when said power supply voltage is low.

27. A method of controlling an electronic device according to claim 26, further comprising a position detecting step for detecting a back electromotive force excited by rotation of said rotor, wherein in said quick driving step, the timing of outputting said quick driving pulse is determined in accordance with a detection timing detected in said position detecting step, and wherein when said detection timing is not obtained, the intervals between the quick driving pulses are decreased when said power supply voltage is high, whereas, the intervals between the quick driving pulses are increased when said power supply voltage is low.

28. A method of controlling an electronic device, according to claim 26, further comprising a position detecting step for detecting a back electromotive force excited by rotation of said rotor, wherein in said quick driving step, the pulse width of said quick driving pulse is determined in accordance with a detection timing detected in said position detecting step, and wherein when said detection timing is not obtained, a quick driving pulse with a small pulse width is output if said power supply voltage is high, whereas, a quick driving pulse with a large pulse width is output if said power supply voltage is low.

29. A method of controlling an electronic device, according to claim 25, further comprising a voltage control step for increasing or decreasing said power supply voltage of the driving pulse.

30. An electronic device comprising:
   a stepping motor including: a rotor magnetized in the form of a magnetic multipole; and a stator including a driving coil, said rotor being rotatable in said stator;
   a driving controller selectively supplying a driving pulse to said driving coil to rotate said rotor; and
   an electric power supplier serving as a power supply of said driving pulse,
   wherein said driving controller is capable of changing the timing of supplying said driving pulse in accordance with the power supply voltage of said driving pulse.

31. An electronic device according to claim 30, wherein said driving controller includes a quick driving controller for supplying quick driving pulses at intervals shorter than intervals at which normal driving pulses are supplied,
   and wherein said quick driving controller decreases the intervals between the quick driving pulses when said power supply voltage is high whereas said quick driving controller increases the intervals between the quick driving pulses when said power supply voltage is low.

32. An electronic device according to claim 31, further comprising a position detecting circuit detecting a back electromotive force induced by rotation of said rotor, wherein said quick driving controller determines the interval of said quick driving pulse in accordance with a detection timing detected by said position detecting circuit, and wherein when said detection timing is not obtained, said quick driving controller decreases the intervals between the quick driving pulses when said power supply voltage is high whereas said quick driving controller increases the intervals between the quick driving pulses when said power supply voltage is low.

33. An electronic device according to claim 31, further comprising position detecting means for detecting a back electromotive force induced by rotation of said rotor, wherein said quick driving controller determines the pulse width of said quick driving pulse in accordance with a detection timing detected by said position detecting means, and wherein when said detection timing is not obtained, said quick driving controller outputs a quick driving pulse with a small pulse width if said power supply voltage is high, whereas, said quick driving controller outputs a quick driving pulse with a large pulse width if said power supply voltage is low.

34. An electronic device according to claim 30, wherein said electric power supplying means includes voltage control means capable of increasing or decreasing said power supply voltage.

35. An electronic device according to claim 30, wherein the timing between supplying said driving pulses is changed.

36. An electronic device according to claim 30, wherein the timing of the duration of said driving pulses is changed.

* * * * *